(12) United States Patent
Fujii

(10) Patent No.: US 9,537,849 B2
(45) Date of Patent: Jan. 3, 2017

(54) SERVICE PROVISION SYSTEM, SERVICE PROVISION METHOD, AND COMPUTER PROGRAM PRODUCT

(71) Applicant: Yuu Fujii, Kanagawa (JP)

(72) Inventor: Yuu Fujii, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 128 days.

(21) Appl. No.: 14/337,362

(22) Filed: Jul. 22, 2014

(65) Prior Publication Data

US 2015/0040187 A1    Feb. 5, 2015

(30) Foreign Application Priority Data

Jul. 31, 2013  (JP) .................................. 2013-159811
Jul. 31, 2013  (JP) .................................. 2013-159813

(Continued)

(51) Int. Cl.
*G06F 7/04*      (2006.01)
*H04L 29/06*    (2006.01)
*H04L 12/58*    (2006.01)

(52) U.S. Cl.
CPC .............. *H04L 63/08* (2013.01); *H04L 51/08* (2013.01); *H04L 63/0876* (2013.01)

(58) Field of Classification Search
CPC ....... H04L 63/08; H04L 51/08; H04L 63/0876
See application file for complete search history.

(56) References Cited

U.S. PATENT DOCUMENTS

2006/0015745 A1*  1/2006  Sukigara ................. G06F 21/33
                                                                713/182
2006/0206709 A1*  9/2006  Labrou ................... G06Q 20/18
                                                                713/167

(Continued)

FOREIGN PATENT DOCUMENTS

JP         2000-163330         6/2000
JP         2006-324724        11/2006

(Continued)

*Primary Examiner* — Techane Gergiso
(74) *Attorney, Agent, or Firm* — Harness, Dickey & Pierce, P.L.C.

(57) ABSTRACT

A service provision system includes: a management information storage unit that stores management information for managing user identification information, device identification information, and service identification information in association with one another; an authentication information receiving unit that receives authentication information including user authentication information and device authentication information from a device connected via a network; a service specifying unit that specifies, when the authentication information is authenticated by an authentication unit, a service associated with the authentication information based on the authentication information and the management information; and a first execution unit that receives a use request of a mail distribution service from the first device connected via the network, composes a mail according to the use request of the mail distribution service received from the first device, and distributes the composed mail to a previously specified mail server connected to the service provision system via a network.

17 Claims, 25 Drawing Sheets

(30) Foreign Application Priority Data

Jul. 31, 2013 (JP) ................................. 2013-159818
Jul. 31, 2013 (JP) ................................. 2013-159819

(56) References Cited

U.S. PATENT DOCUMENTS

| | | | |
|---|---|---|---|
| 2006/0288403 A1* | 12/2006 | Kurihara | G06F 21/10 726/4 |
| 2009/0113560 A1* | 4/2009 | Kori | G06F 21/10 726/29 |
| 2013/0061307 A1* | 3/2013 | Livne | H04W 12/06 726/7 |
| 2013/0094049 A1 | 4/2013 | Mori | |
| 2013/0191904 A1* | 7/2013 | Piliouras | H04L 63/12 726/7 |
| 2013/0194633 A1 | 8/2013 | Takatsu et al. | |
| 2013/0198211 A1 | 8/2013 | Kohkaki et al. | |
| 2013/0198806 A1 | 8/2013 | Takatsu et al. | |
| 2014/0189808 A1* | 7/2014 | Mahaffey | H04L 63/0853 726/4 |

FOREIGN PATENT DOCUMENTS

| | | |
|---|---|---|
| JP | 2007-158581 | 6/2007 |
| JP | 2009-290730 | 12/2009 |
| JP | 2010-238218 | 10/2010 |
| JP | 2013-021532 | 1/2013 |
| JP | 2013-178748 | 9/2013 |
| JP | 2013-242848 | 12/2013 |
| JP | 2013-257859 | 12/2013 |
| JP | 2014-089678 | 5/2014 |
| JP | 2014-089680 | 5/2014 |
| JP | 2015032041 A | 2/2015 |
| JP | 2015032043 A | 2/2015 |

\* cited by examiner

FIG.4

| LICENSE TYPE | ID | REGISTRATION CODE | REGISTRATION STATUS |
|---|---|---|---|
| TENANT | 10000 | AAA | REGISTERED |
| TENANT | 10001 | AAB | REGISTERED |
| TENANT | 10002 | AAC | UNREGISTERED |
| PRINT SERVICE | 20000 | – | REGISTERED |
| PRINT SERVICE | 20001 | – | REGISTERED |
| PRINT SERVICE | 20002 | – | UNREGISTERED |
| DISTRIBUTION SERVICE | 30000 | – | REGISTERED |
| DISTRIBUTION SERVICE | 30001 | – | REGISTERED |
| DISTRIBUTION SERVICE | 30002 | – | UNREGISTERED |
| ... | ... | ... | ... |

FIG.5

| TENANT ID | NAME | SERVICE ID | SERVICE TYPE | VALIDITY PERIOD | EXTERNAL SERVICE | EXTERNAL SERVICE | ADDRESS INFORMATION |
|---|---|---|---|---|---|---|---|
| 10000 | COMPANY A | 20000 | PRINT SERVICE | 1 YEAR | ONLINE STORAGE A | ONLINE STORAGE B | A@aaa.com |
| | | 20001 | PRINT SERVICE | 1 YEAR | | | |
| | | 30000 | DISTRIBUTION SERVICE | 1 YEAR | | | |
| 10001 | COMPANY B | 30001 | DISTRIBUTION SERVICE | 1 YEAR | ONLINE STORAGE A | – | A@bbb.com |
| ... | ... | ... | ... | ... | ... | ... | ... |

FIG.6

| TENANT ID | LOGIN ID | | IN-HOUSE AUTHEN-TICATION | ONLINE STORAGE A | | | ONLINE STORAGE B | | | ADDRESS INFOR-MATION | |
|---|---|---|---|---|---|---|---|---|---|---|---|
| | USER ID | PASSWORD | USER ID | ACCOUNT | PASSWORD | ACCOUNT | AUTHORIZA-TION TOKEN | SCOPE | | | |
| 10000 | YAMADA | 123 | Yamada | YYamada | 1234 | yamada | aaaaa | aa, bb | A@aaa.com | ... |
| | SATOH | 456 | SatohY | Sato | 4567 | sato | bbbbb | aa | B@aaa.com | ... |
| | SUZUKI | 789 | SuzukiK | SUZUKI | 7890 | Suzuki | ccccc | bb, cc | C@aaa.com | ... |
| 10001 | SUZUKI | 111 | — | TSuzuki | 1111 | — | — | — | A@bbb.com | ... |
| | SASAKI | 222 | — | SASAKI | 222 | — | — | — | D@bbb.com | ... |
| ... | ... | ... | ... | ... | ... | ... | ... | ... | ... | ... |

FIG.7

| TENANT ID | DEVICE ID | SERVICE ID | SERVICE TYPE | START DATE OF USE | END DATE OF USE | ... |
|---|---|---|---|---|---|---|
| 10000 | 1 | 20000 | PRINT SERVICE | 2012/1/1 | 2012/12/31 | ... |
| | | 30000 | DISTRIBUTION SERVICE | 2012/6/1 | 2013/5/31 | ... |
| | 2 | 20001 | PRINT SERVICE | 2012/6/1 | 2013/5/31 | ... |
| 10001 | 3 | 30001 | DISTRIBUTION SERVICE | 2013/1/1 | 2013/12/31 | ... |
| ... | ... | ... | ... | ... | ... | ... |

FIG.8

| EXTERNAL SERVICE ID | SERVICE NAME | CLIENT ID | CLIENT SECRET | PRODUCT NAME | SCOPE | | | AUTHORIZATION DESTINATION URL | REDIRECT DESTINATION URL |
|---|---|---|---|---|---|---|---|---|---|
| 001 | ONLINE STORAGE A | | | | | | | | |
| 002 | ONLINE STORAGE B | ABCDE | XXXXX | Service | aa | bb | cc | http://www.001.com/auth | http://www.xxx.com/callback |
| ... | ... | ... | ... | ... | ... | | | ... | ... |

FIG.9

| SERVICE ID | SERVICE NAME | OPTIONS |
|---|---|---|
| 30000 | DISTRIBUTION SERVICE | OCR PROCESSING PDF PROCESSING |
| 20000 | PRINT SERVICE | UPPER-LIMIT MANAGEMENT PROCESSING |

FIG.10

| TENANT ID | SERVICE NAME | SERVICE ID | AVAILABLE OPTIONS | WORKFLOW |
|---|---|---|---|---|
| 10000 | DISTRIBUTION SERVICE | 30000 | ·DISTRIBUTION PROCESSING (A)<br>·OCR PROCESSING (B)<br>·PDF PROCESSING (C)<br>·BARCODE PROCESSING (D)<br>·IMAGE CORRECTION PROCESSING (E) | B→C→A |
| 10001 | DISTRIBUTION SERVICE | 30001 | ·DISTRIBUTION PROCESSING (A)<br>·FOLDER DISTRIBUTION (B)<br>·PDF PROCESSING (C) | C→B |

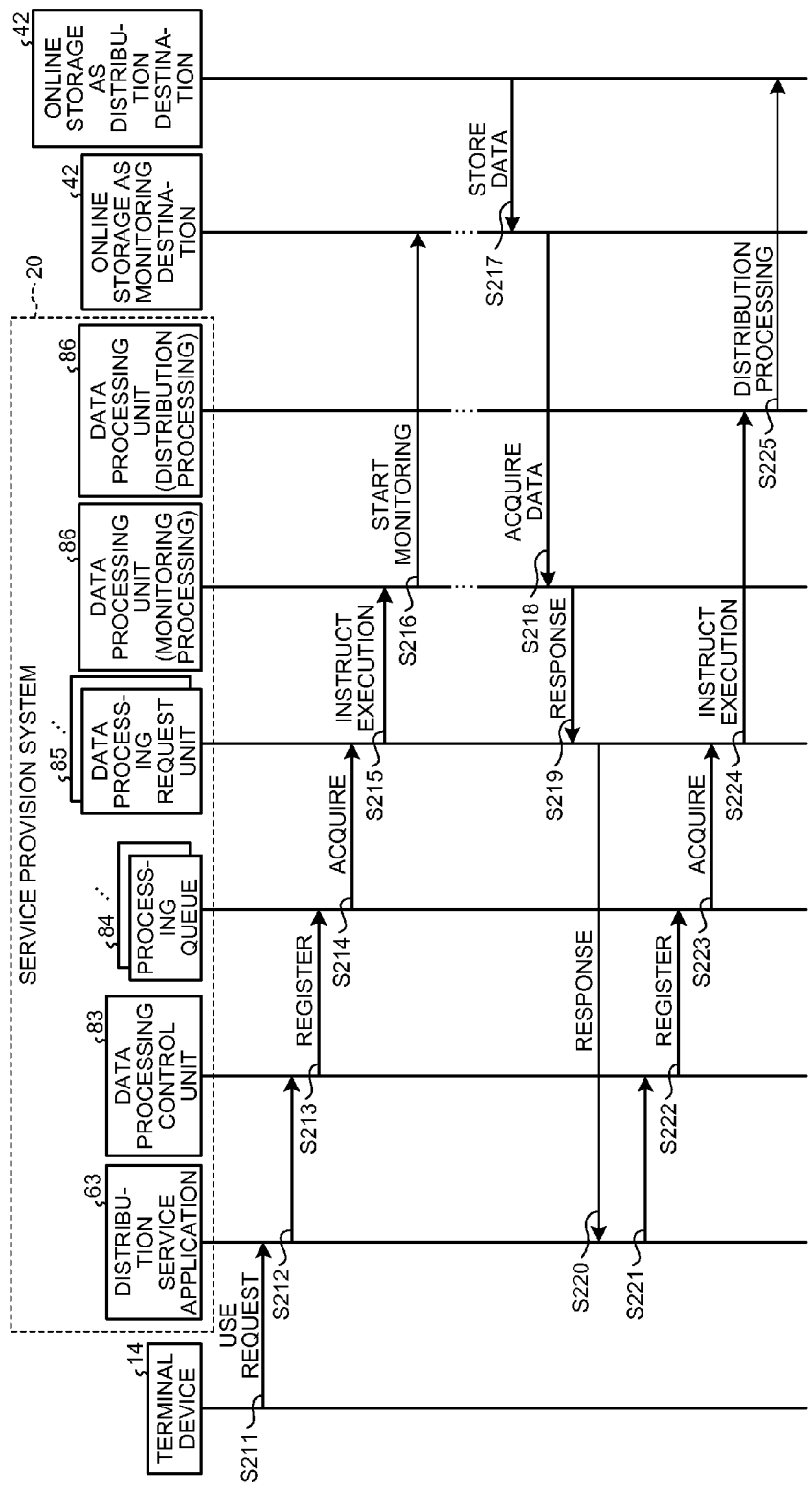

SERVICE PROVISION SYSTEM, SERVICE PROVISION METHOD, AND COMPUTER PROGRAM PRODUCT

CROSS-REFERENCE TO RELATED APPLICATION(S)

The present application claims priority to and incorporates by reference the entire contents of Japanese Patent Application No. 2013-159811 filed in Japan on Jul. 31, 2013, Japanese Patent Application No. 2013-159818 filed in Japan on Jul. 31, 2013 Japanese Patent Application No. 2013-159813 filed in Japan on Jul. 31, 2013 and Japanese Patent Application No. 2013-159819 filed in Japan on Jul. 31, 2013.

BACKGROUND OF THE INVENTION

1. Field of the Invention

The present invention relates to a service provision system, a service provision method, and a computer program product.

2. Description of the Related Art

Conventionally, a function of distributing data to a specified distribution destination has a plurality of variations. For example, a multifunction peripheral has a function of transmitting image data obtained by scanning by e-mail. For example, a multifunction peripheral also has a function of uploading image data obtained by scanning to a specific folder at a specified time. For example, a multifunction peripheral further has a function of transmitting image data received by facsimile to a specific server or the like on a network. For example, when data is stored in a specific folder of a specific server in an in-house network system, a technology for reading the data and distributing the read data to other server is known.

SUMMARY OF THE INVENTION

It is an object of the present invention to at least partially solve the problems in the conventional technology.

A service provision system includes one or more information processing devices and provides a service to a device connected thereto via a network. The service provision system includes: a management information storage unit that stores management information for managing user identification information for identifying a user, device identification information for identifying a first device, and service identification information for identifying a service registered as a use object in association with one another; an authentication information receiving unit that receives authentication information including user authentication information used for user authentication and device authentication information used for device authentication from the device connected via the network; an authentication unit that executes authentication processing of the received authentication information; a service specifying unit that specifies, when the authentication information is authenticated, a service associated with the authentication information based on the authentication information and the management information; and a first execution unit that receives a use request of a mail distribution service from the first device connected via the network, composes a mail according to the use request of the mail distribution service received from the first device, and distributes the composed mail to a previously specified mail server connected to the service provision system via a network.

A service provision method is executed by a service provision system that includes one or more information processing devices and provides a service to a device connected thereto via a network. The method includes: storing management information for managing user identification information for identifying a user, device identification information for identifying a first device, and service identification information for identifying a service registered as a use object in association with one another in a management information storage unit; receiving authentication information including user authentication information used for user authentication and device authentication information used for device authentication from the device connected via the network; executing authentication processing of the received authentication information; specifying, when the authentication information is authenticated, a service associated with the authentication information based on the authentication information and the management information; and executing including receiving a use request of a mail distribution service from the first device connected via the network, composing a mail according to the use request of the mail distribution service received from the first device, and distributing the composed mail to a previously specified mail server connected to the service provision system via a network.

A computer program product includes a non-transitory computer-readable medium containing an information processing program causing an information processing device to function as a service provision system that provides a service to a device connected thereto via a network. The program causing the information processing device to function as: a management information storage unit that stores management information for managing user identification information for identifying a user, device identification information for identifying a first device, and service identification information for identifying a service registered as a use object in association with one another; an authentication information receiving unit that receives authentication information including user authentication information used for user authentication and device authentication information used for device authentication from the device connected via the network; an authentication unit that executes authentication processing of the received authentication information; a service specifying unit that specifies, when the authentication information is authenticated, a service associated with the authentication information based on the authentication information and the management information; and a first execution unit that receives a use request of a mail distribution service from the first device connected via the network, composes a mail according to the use request of the mail distribution service received from the first device, and distributes the composed mail to a previously specified mail server connected to the service provision system via a network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of a data configuration example of license information;

FIG. 5 is a diagram of a data configuration example of tenant information;

FIG. 6 is a diagram of a data configuration example of user information;

FIG. 7 is a diagram of a data configuration example of device information;

FIG. 8 is a diagram of a data configuration example of external service information;

FIG. 9 is a diagram of a data configuration example of service information;

FIG. 10 is a diagram of a data configuration example of registration information;

FIG. 27 is a sequence diagram upon execution of the folder monitoring service.

DETAILED DESCRIPTION OF THE PREFERRED EMBODIMENTS

System Configuration

Figure 1:
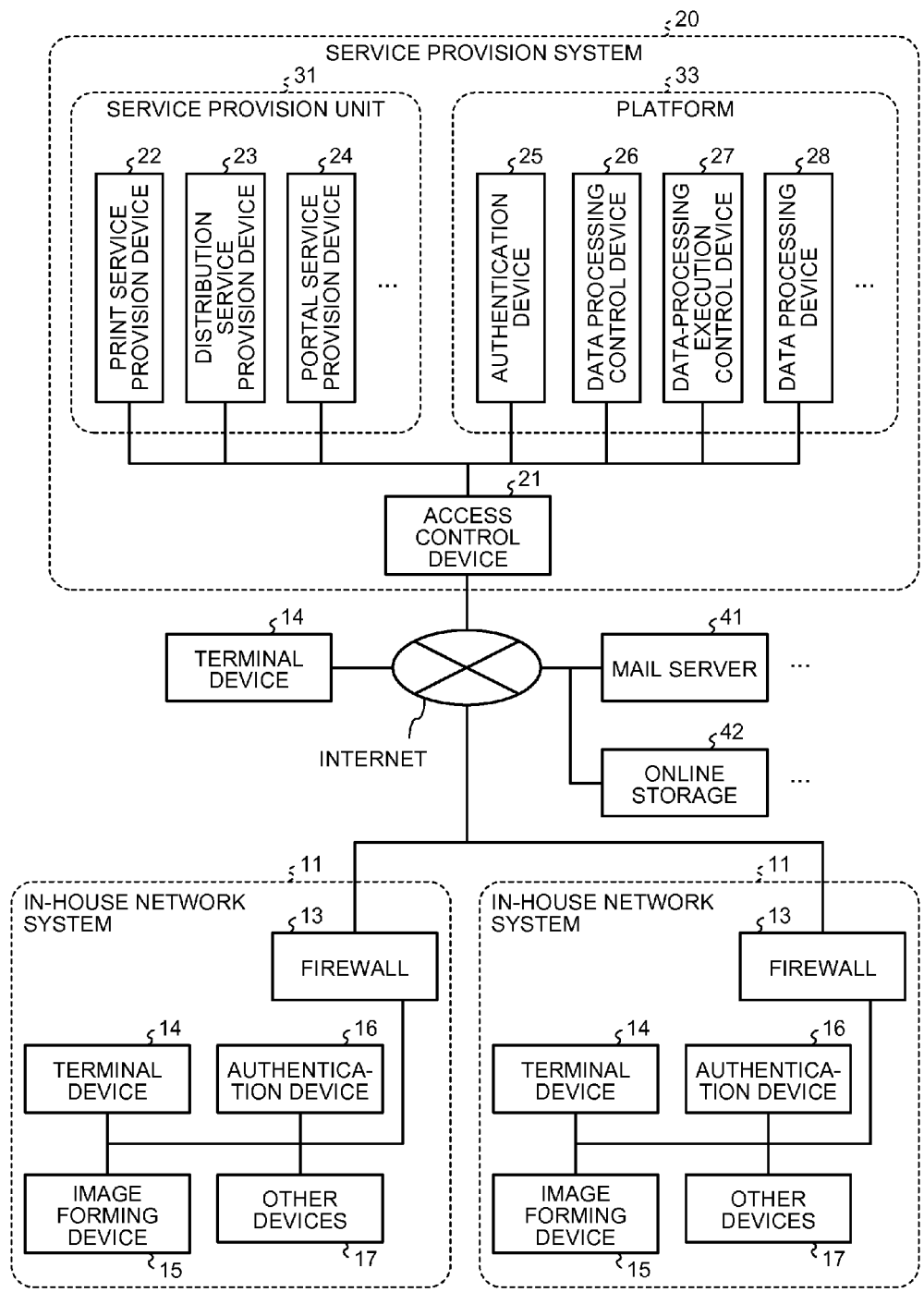
FIG. 1 is a diagram of a configuration example of a system 10 according to a present embodiment.

FIG. 1 is a diagram of a configuration example of a system 10 according to a present embodiment. The system 10 according to the present embodiment includes at least one of in-house network systems 11 and a service provision system 20 typified by cloud services. At least one of the in-house network systems 11 and the service provision system 20 are connected to each other via a network such as the Internet.

The in-house network system 11 has a firewall 13. The firewall 13 restricts unauthorized access from the outside to devices connected in the in-house network system 11.

The service provision system 20 has an access control device 21. The access control device 21 controls an access from the outside to a device connected in the service provision system 20.

The in-house network system 11 includes, but not limited to, a terminal device 14, an image forming device 15, an authentication device 16, and other devices 17. Each of the terminal device 14, the image forming device 15, the authentication device 16, and the other devices 17 has a wired or wireless communication unit, and the devices are connected to each other via a private network provided inside the firewall 13.

The terminal device 14 is implemented by an information processing device (e.g., a computer system 50 explained later) with an ordinary operating system (OS) and the like. The terminal device 14 is, as an example, a personal computer, a tablet computer, a notebook computer, a smartphone, or a mobile phone, and may be any device that can be operated by a user.

The image forming device 15 has an image forming function such as a multifunction peripheral, a copy machine, a scanner, or a laser printer. The authentication device 16 is implemented by an information processing device (e.g., the computer system 50 explained later) with the ordinary OS for server and the like. The authentication device 16 provides a user authentication function to the terminal device 14 and the image forming device 15. The other devices 17 are, for example, electronic apparatuses such as a projector and an electronic blackboard. The in-house network system 11 may include the terminal device 14, the image forming device 15, the authentication device 16, and the other devices 17 in plurality, respectively.

The service provision system 20 is a system for providing cloud services to devices and the like on the network. The service provision system 20 may be a system for providing, instead of the cloud services, services provided by an application service provider (ASP) or providing Web services or the like to devices on the network.

Each of the devices in the service provision system 20 is connected to the network such as the Internet via the access control device 21. The service provision system 20 includes the access control device 21, a print service provision device 22, a distribution service provision device 23, a portal service provision device 24, an authentication device 25, a data processing control device 26, a data-processing execution control device 27, and a data processing device 28. These devices are connected to each other via the network within the service provision system 20.

Each of the devices in the service provision system 20 is implemented by one or more information processing devices (e.g., the computer system 50 explained later). In other words, the devices may be implemented by a single computer or may be implemented by being distributed to a plurality of computers. The devices in the service provision system 20 may be implemented by being integrated into one device. Therefore, the scope of the present invention is not limited by the number of information processing devices that form and implement the service provision system 20.

Part of or whole of the service provision system 20 may be provided on a private network in the in-house network system 11. In other words, the system 10 according to the present embodiment represents only a preferred example, and therefore the scope of the present invention is not limited by whether the firewall 13 is provided between the service provision system 20 and each of the devices accessed in order to use the service provision system 20.

The service provision system 20 has a device group (service provision unit 31) implementing a service provision function for providing various services and a device group (platform 33) implementing a common platform function capable of being commonly used when various services are to be used. The service provision unit 31 includes, but not limited to, the print service provision device 22, the distribution service provision device 23, and the portal service provision device 24 (service specifying unit). The platform 33 includes, but not limited to, the authentication device 25, the data processing control device 26, the data-processing execution control device 27, and the data processing device 28 (execution unit).

The service provision system 20 can be roughly divided into the service provision unit 31 and the platform 33. However, the rough division is based on a conceptual way of division in order for easy explanation of the present invention, and therefore the service provision system 20 is not necessarily implemented by the devices configured in the above manner.

The service provision system 20 is connected with the terminal device 14, a mail server 41, the online storage 42, and the like via the network such as the Internet. The terminal device 14 is implemented by an information processing device (e.g., the computer system 50 explained later) with the ordinary OS and the like. The terminal device 14 is an electronic apparatus operable by the user, such as a personal computer (PC), a tablet computer, a notebook computer, a smartphone, or a mobile phone. The mail server 41 is implemented by one or more information processing devices. The mail server 41 is a server for transmitting and receiving electronic mails. The online storage 42 is implemented by one or more information processing devices. The online storage 42 is a server for providing a service for providing a storage area of a storage (storage device).

Figure 2:
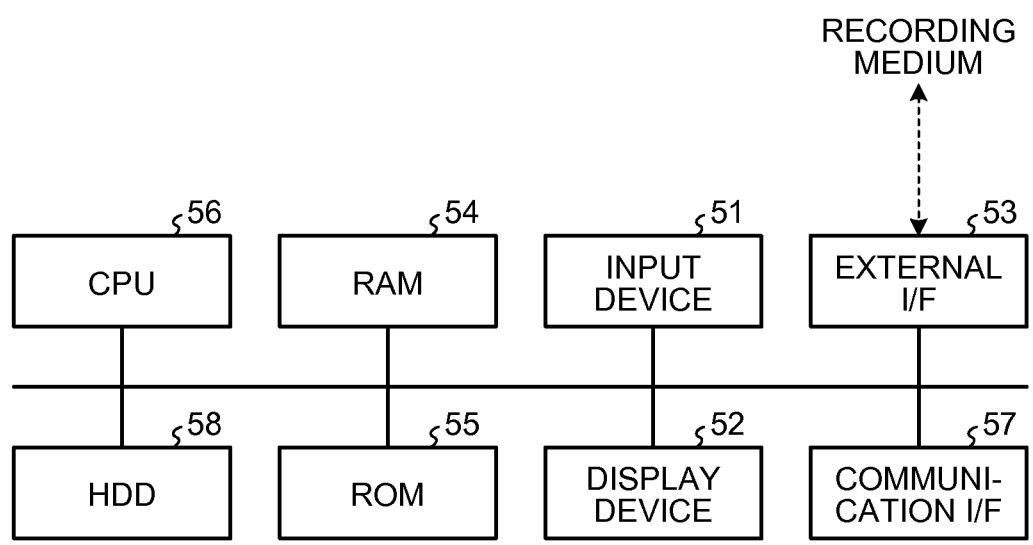
FIG. 2 is a diagram of a hardware configuration example of a computer system 50 according to the present embodiment.

Hardware Configuration of Computer System 50 FIG. 2 is a diagram of a hardware configuration example of the computer system 50 according to the present embodiment. The terminal device 14, the authentication device 16, and the devices in the service provision system 20 illustrated in FIG. 1 are implemented by, for example, the computer system 50 with a hardware configuration illustrated in FIG. 2.

The computer system 50 includes, but not limited to, an input device 51, a display device 52, an external interface (I/F) 53, a random access memory (RAM) 54, a read-only memory (ROM) 55, a central processing unit (CPU) 56, a communication I/F 57, and a hard disk drive (HDD) 58, which are connected to each other via a bus.

The input device 51 is a keyboard, a mouse, a touch panel, and the like, which are used by the user to input information. The display device 52 is a display or so, and displays a processing result obtained by the computer system 50.

The communication I/F 57 is an interface for connecting the computer system 50 to the network. The computer system 50 can perform data communication with other devices via the communication I/F 57.

The HDD 58 is a nonvolatile storage device for storing programs and data. The programs and data stored in the HDD 58 include, but not limited to, the OS being basic software for controlling the entire computer system 50, and application software for providing various functions on the OS. The HDD 58 manages the stored programs and data by a predetermined file system or database (DB) or the like.

The external I/F 53 is an interface with an external device such as a recording medium. The computer system 50 can read data from and write data to the recording medium via the external I/F 53. The recording medium is, for example, a flexible disk, a compact disk (CD), a digital versatile disk (DVD), a secure digital (SD) memory card, and a universal serial bus (USB) memory.

The ROM 55 is a nonvolatile semiconductor memory capable of storing programs and data even after power is turned off. The ROM 55 stores therein programs and data required for a basic input/output system (BIOS), OS setting, and network setting which are executed when the computer system 50 is started. The RAM 54 is a volatile semiconductor memory for temporarily storing a program and data.

The CPU 56 implements the overall control and functions of the computer system 50 by loading a program and data to the RAM 54 from the storage device such as the ROM 55 or the HDD 58 and executing processing. The terminal device 14, the authentication device 16, and the devices in the service provision system 20 according to the present embodiment can implement various processings, as explained later, by the hardware configuration of the computer system 50.

Software Functional Configuration for Service Provision System 20.

Figure 3:
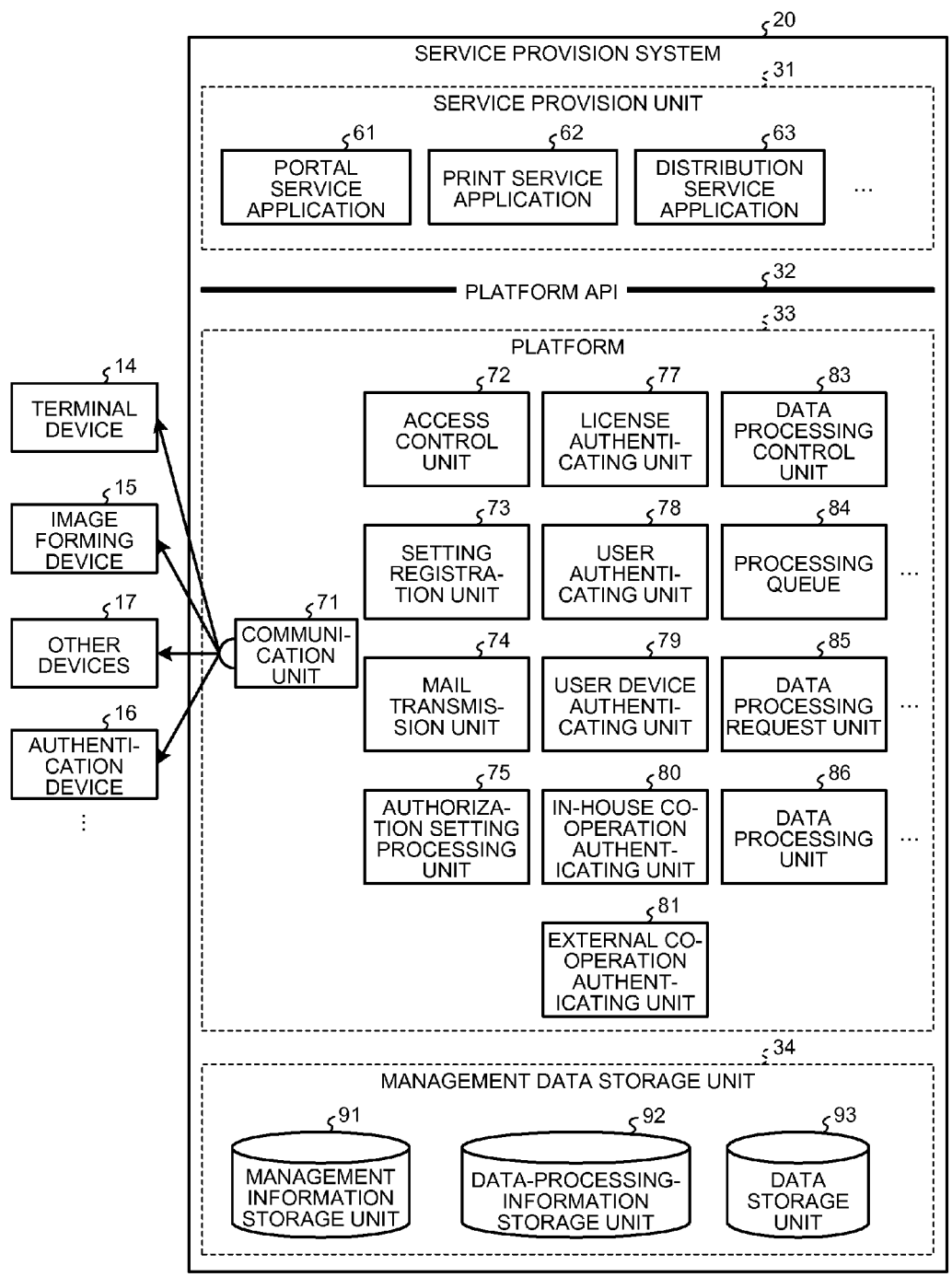
FIG. 3 is a diagram of a software functional configuration for a service provision system 20 according to the present embodiment.

FIG. 3 is a diagram of a software functional configuration for the service provision system 20 according to the present embodiment. The service provision system 20 executes a program to implement the service provision unit 31, a platform application programming interface (platform API) 32, and the platform 33. The service provision system 20 also implements a management data storage unit 34 using an internally provided storage device.

The service provision unit 31 has a function implemented by executing various service applications (application programs for providing services). The service provision unit 31 includes, but not limited to, a portal service application 61, a print service application 62, and a distribution service application 63.

The portal service application 61 is implemented by the portal service provision device 24 executing an application program for providing a portable service. The print service application 62 is implemented by the print service provision device 22 executing an application program for providing a print service. The distribution service application 63 is implemented by the distribution service provision device 23 executing an application program for providing a distribution service.

The portal service application 61 provides processing for tenant registration, service registration, and registration of various pieces of management information and the like, as preprocessing for service provision using various service applications. The print service application 62 provides a print service that causes the image forming device 15 to print print data.

The distribution service application 63 provides services for distributing data to a server (storage device) on the network such as the online storage 42 and the mail server 41. In this case, the distribution service application 63 may perform one or a plurality of data processings on the data and distribute the processed data to the server (storage device) on the network.

The service applications are not limited to these examples, and may therefore provide, for example, a service for transmitting stored image data (projection data) to a projector and a service for transmitting stored image data (projection data) to an electronic blackboard device. That is, the service application may be any application that provides some sort of service to a device used by the user.

The platform API 32 is an interface used when a service application operates in cooperation with the platform 33.

The platform API 32 is, as an example, a previously defined interface provided in order that the platform 33 may receive a request from a service application, and includes functions and classes or so. When the service provision system 20 is formed with a plurality of distributed information processing devices, the platform API 32 may be, for example, a WebAPI accessible via the network.

The platform 33 includes a communication unit 71, an access control unit 72, a setting registration unit 73, a mail transmission unit 74, an authorization setting processing unit 75, a license authenticating unit 77, a user authenticating unit 78, a user device authenticating unit 79, an in-house cooperation authenticating unit 80, an external cooperation authenticating unit 81, a data processing control unit 83, a plurality of processing queues 84, a plurality of data processing request units 85, and a plurality of data processing units 86. The management data storage unit 34 includes a management information storage unit 91 (management information storage unit, workflow storage unit), a data-processing-information storage unit 92, and a data storage unit 93.

The communication unit 71 is a function unit for communicating with each of the devices on the network, and is provided in, for example, the access control device 21. The access control unit 72 is a function unit for performing controls according to various accesses requested from the devices on the network to the service provision system 20, and is provided in, for example, the access control device 21.

The setting registration unit 73 is a function unit for registering various pieces of setting information stored in the management information storage unit 91, and is provided in, for example, the authentication device 25. The mail transmission unit 74 is a function unit for transmitting mails, and is provided in, for example, the authentication device 25. The authorization setting processing unit 75 is a function unit for performing authorization setting corresponding to an external service such as the online storage 42, and is provided in, for example, the authentication device 25.

The license authenticating unit 77 is a function unit for performing authentication on license based on the license information or the tenant information stored in the management information storage unit 91, and is provided in, for example, the authentication device 25. The user authenticating unit 78 is a function unit for performing user authentication based on a login request from a device such as the terminal device 14 for which device authentication is not required, and is provided in, for example, the authentication device 25. The user device authenticating unit 79 is a function unit for performing user authentication based on a login request from a device such as the image forming device 15 for which device authentication is required, and is provided in, for example, the authentication device 25. The in-house cooperation authenticating unit 80 is a function unit for performing user authentication when the user information acquired from the authentication device 25 is used to log in at a time of authentication performed by the authentication device 16 of the in-house network system 11 in a device such as the image forming device 15, and is provided in, for example, the authentication device 25. The external cooperation authenticating unit 81 is a function unit for performing authentication processing for logging in to the online storage 42, and is provided in, for example, the authentication device 25.

The data processing control unit 83 is a function unit for controlling data processing executed based on a request from a service application, and is provided in, for example, the data processing control device 26. Each of the processing queues 84 is a message queue for storing execution request information (message) from a service application on data processing of a corresponding type. The data processing control unit 83 registers a message to each of the processing queues 84. Each of the processing queues 84 is provided in, for example, the data processing control device 26. The data processing request unit 85 is a function unit for requesting, when monitoring a processing queue 84 allocated thereto and acquiring a message registered in the allocated processing queue 84, execution of corresponding data processing to any one of the data processing units 86, and is provided in, for example, the data-processing execution control device 27.

Each of the data processing units 86 is a function unit for performing data processing corresponding to a request, and is provided in, for example, the data processing device 28. The data processing unit 86 executes, as examples, division processing for data processing requested from a service application, data format conversion processing of conversion of data format (e.g., processing for conversion of a data format into a portable document format (PDF), or PDF processing), optical character recognition (OCR) processing for performing OCR, and processing for distributing (uploading) data to the online storage 42 or the mail server 41. The data processing request units 85 and the data processing units 86 may be provided in the data-processing execution control device 27 according to the content of the data processing.

The management information storage unit 91 stores therein management information such as license information, tenant identification data (ID) information, user information, device information, service information, and registration information, and is provided in, for example, the authentication device 25. The data-processing-information storage unit 92 stores therein information on requested data processing, and is provided in, for example, the data processing control device 26. The data storage unit 93 stores therein application data, print data, and the like, and the other data, and is provided in, for example, the data processing control device 26.

Management Information

FIG. 4 is a diagram of a data configuration example of license information. The license information is a table for managing licenses registered in the service provision system 20. The license information has License Type, ID, Registration Code, Registration Status, and the like as data items.

The license type is information indicating a type of license. The type of license includes tenant, print service, distribution service, and the like. The ID is ID of a license and is information used for license authentication. The registration code is information used for registration of a tenant. The registration status is information representing a status (Registered or Unregistered) as to whether the user completes license registration (ID registration).

FIG. 5 is a diagram of a data configuration example of the tenant information. The tenant information is a table for managing information, for each organization, on organizations (group, company, school, etc.) to which the service provision system 20 can provide services. The tenant information has Tenant ID (organization identification information), Name, Service ID, Service Type, Validity Period, External Services, Address Information, and the like as data items.

The tenant ID is information for identifying an organization, and is registered through tenant registration performed by the user. The name is a name of a company or a name of an organization or the like, and is set by the user (e.g., a manager of the organization) upon registration of the tenant ID.

The service ID is information for identifying a service usable by the user belonging to the organization, and is set by the user (e.g., a manager of the organization) after the tenant registration. The service type is information for specifying a type of registered service. The validity period is a validity period during which the service is available, and is set, for example, at a time point at which a start of use of the service is registered. The external service is information on an external service for providing a service in cooperation with the service provision system 20. The external service includes, for example, a data storage service provided by the online storage 42. The address information is a mail address of a manager of the organization, and is set when the tenant is registered.

FIG. 6 is a diagram of a data configuration example of user information. The user information is a table for managing information, for each user, on users to which the service provision system 20 can provide services. The user information has Tenant ID; User ID and Password for Login; User ID for In-House Authentication; Account, Password, Authorization Token, and Scope for Online Storage 42; and Address Information or the like, as data items.

The tenant ID is information for identifying an organization to which the user belongs. The user ID and password for login are information for identifying and authorizing the user to log in to the service provision system 20. The user ID for login may be any information capable of identifying the user.

The user ID for in-house authentication is information for identifying and authenticating the user in the authentication device 16 of the in-house network system 11. The user ID for in-house authentication may be user identification information capable of identifying the user in the authentication device 16 of the in-house network system 11, and may therefore be a card ID of an integrated circuit (IC) card or a terminal ID of a mobile terminal, or so, carried by the user.

The account and password for the online storage 42 are identification and authentication information for logging in to the online storage 42. The authorization token is information for using the online storage 42 within a scope of specific authority. The scope is information for specifying a scope of using the online storage 42. The account may be any one of the user ID, the user name, and the address for the online storage 42, and may be any authentication information used for authentication when the user is to log in to a target online storage 42. The address information is a user mail address.

The online storage 42 is an example of external services. The information such as Account, Password, Authorization Token, and Scope is an example of information used when an external service is used. The authorization token represents a scope of usage (authority) upon the usage of services as to which service is to be used or as to which resource is allowed to be accessed when the user uses a service, and can set the authorization by using, for example, standard technology of API authorization called OAuth. When usage of an external service such as the online storage 42 is viewed from the service provision system 20, the external service functions as a service provider of OAuth, and the service provision system 20 functions as a consumer of OAuth.

FIG. 7 is a diagram of a data configuration example of device information. The device information is a table for managing information on devices capable of using services provided by the service provision system 20. The device information has Tenant ID, Device ID, Service ID, Service Type, Start Date of Use, End Date of Use, and the like, as data items.

The tenant ID is information for identifying an organization in which the device is used. The device ID is information for identifying the device and is used for device authentication. The device ID is, as an example, a machine number of the device. The service ID and the service type are identification information and contents of services with which the device can be provided. The start date of use is a date on which the provision of the service to the device is started. The end date of use is a date on which the provision of the service to the device is ended.

The device registered in the device information can use services of the registered service ID during a period from the start date of use of the service ID to the end date of use. The validity period may not be limited (there is substantially no restriction to the period) depending on the type of service or the type of license. Even if the device is not registered in the device information, the device can use services (functions) provided by the service provision system 20. However, some of the functions provided by the service cannot be used unless the device authentication is performed on the device.

In the present embodiment, the terminal device 14 is exemplified as an example of the device for which registration of the device information is not required, and the image forming device 15 is exemplified as an example of the device for which registration is required. As an example of functions usable in the terminal device 14, registration of various pieces of management information and entry or deletion of data for an object to be printed are exemplified, while as an example of functions usable in the image forming device 15, acquisition of print data and transmission of distribution data are exemplified. A provider side for providing services may determine whether the device authentication is required depending on which of the functions is used, and there may be any service without requiring the device authentication.

FIG. 8 is a diagram of a data configuration example of external service information. The external service information is a table for managing information on external services. The external service information has External Service ID, Service Name, Client ID, Client Secret, Product Name, Scope, Authorization destination Uniform Resource Locator (Authorization destination URL), Redirect Destination URL, and the like, as data items.

The external service ID is information for specifying (identifying) an external service. The service name is a name of the external service. The client ID is information issued by the external service and used by the external service to identify the service provision system 20. The client secret is secret information for guaranteeing the personal identification of a client ID, and is information functioning as a password. The product name is information for specifying a service application. The scope is information for specifying a scope of using the external service. The authorization destination URL is a URL of an authorization system provided in the external service (e.g., a URL for an authorization server provided in the external service). The redirect destination URL is a URL of the service provision system 20 redirected from the external service (e.g., a URL of a function as an authorized client of the authorization setting processing unit 75).

FIG. 9 is a diagram of a data configuration example of service information. The service information is a table for managing options that can be added to services. The service information has Service Name, Service ID, Options, and the like, as data items.

The service name is a name representing an outline of service contents. The service ID is information for identifying a service. The options indicate a list of data processings capable of being added to main data processing of the service. For example, in the example of FIG. 9, as options of the distribution service, the user can add data processing such as optical character recognition (OCR processing), conversion of a file format (e.g., PDF processing), image correction, barcode reading, and extraction of document information. For example, as an option of the print service, the user can add Upper-limit management processing (processing for managing an upper limit of the possible number of prints for each user) to the options.

The service provision system 20 manages such service information, and it is thereby possible to provide the service with other data processings added to the main data processing thereof.

FIG. 10 is a diagram of a data configuration example of registration information. The registration information is a table for managing registered services. The registration information has Tenant ID, Service Name, Service ID, Available Options, Workflow, and the like, as data items.

The tenant ID is information for identifying an organization capable of using the registered service. The service name is a name of the registered service. The service ID is information for identifying the registered service.

The available options represent a list of data processings of available options together with the main data processing of the registered service. For the available options, the user selects data processing from among the data processings illustrated in the options of FIG. 9 when a service is registered. As illustrated in FIG. 10, the main data processing (distribution processing (A)) is represented on the top line in a box of Available Options, and data processings (OCR processing (B), PDF processing (C), Barcode processing (D), and Image correction processing (E) etc.) are represented as options on the second and subsequent lines. As illustrated in the box of Available Options on a second row in FIG. 10, Folder distribution (B) for distributing data to a specified folder may be included as optional data processing.

The workflow is information representing an execution sequence of data processings selected as available options. The workflow is created by the user (manager), for example, at a time of registering a service, by combining the data processings indicated in Available Options of FIG. 10.

As understood from the explanation above, the tenant ID is the information for identifying an organization (group, company, school, etc) to which the user belongs. The tenant ID is information that the service provision system 20 manages users, devices, and services by each organization associated with the service provided by the service provision system 20, the user using the service, and with the device that uses the service. In addition, the tenant ID is information (use object specification information) for specifying a use object in such a manner that which service, among the services that the service provision system 20 can provide, is provided to which user and to which device.

Processing Flow When Tenant ID and Service Are Registered

Figure 11:
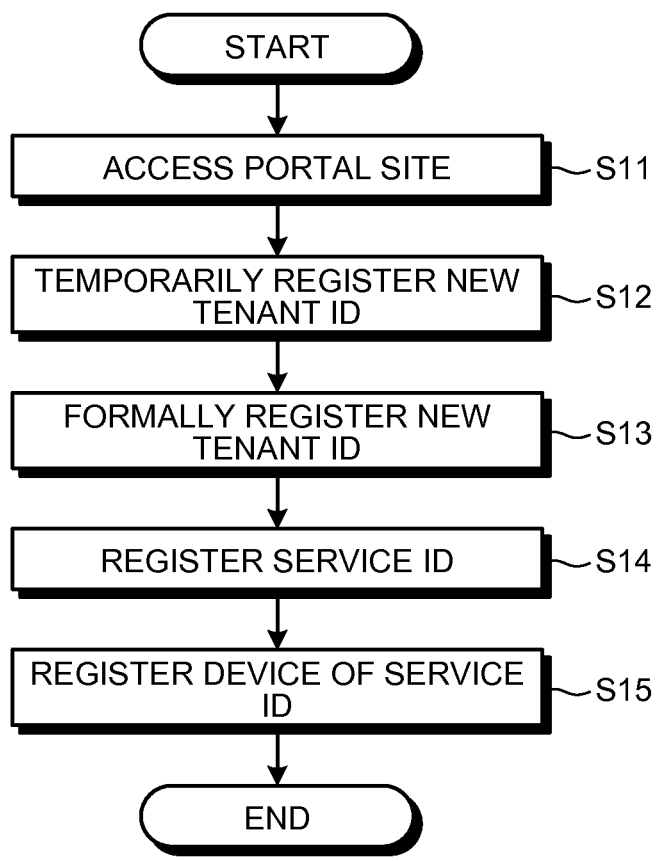
FIG. 11 is a diagram of a processing flow when a tenant ID and a service are registered.

FIG. 11 is a diagram of a processing flow when a tenant ID and a service are registered.

First of all, a user (e.g., a manager of a company or of an organization) wishing to register a tenant ID previously acquires a tenant ID (first service identification information) and a registration code (information for registration) from a service provider (e.g., a person in charge who provides and sells services) of the service provision system 20. As an acquisition method, a method of directly acquiring data from a service provider or a method in which the terminal device 14 of the user accesses a dedicated site managed by the service provider to acquire data is exemplified. Thereafter, the user accesses the portal site of the service provision system 20 from the terminal device 14 (Step S11).

The access control unit 72 of the service provision system 20 allows an access because of the access to the portal site, and causes the terminal device 14 to access the portal service application 61 (first service). The portal service application 61 causes the display device 52 of the terminal device 14 to display a top screen. The user operates the input device 51 of the terminal device 14 and can select whether to request login or to request new tenant registration from the top screen. The explanation is provided herein assuming that the new tenant registration is requested. In the case of the user (manager or other user) registered in the user information of the management information storage unit 91, the login can be made by inputting the tenant ID, the user ID, and the password.

When the new tenant registration is requested (registration request), the portal service application 61 of the service provision system 20 displays an input screen for performing temporary registration of the tenant ID on the display device 52 of the terminal device 14. The user operates the input device 51 of the terminal device 14 to perform an input for temporary registration of the tenant ID and then makes a request for the temporary registration (Step S12).

Information to be input in the input screen is information (which may also be called usage area information) on a country or on a region where services are used, information indicating agreement to "terms of use" (provisions) displayed according to a country or a region where services are used, a tenant ID, a registration code, a mail address, a use language, and the like. Therefore, the service provision system 20 stores the terms of use (provisions) information according to the country or the region where it is used, performs a display control to display the terms of use on the input screen according to the usage area information selected and input by the user, and causes the user to select whether he/she agrees to the terms of use.

When the temporary registration is requested from the terminal device 14 of the user, the portal service application 61 requests the license authenticating unit 77 (license authenticating unit) to perform verification processing for validity of the input tenant ID and registration code. The license authenticating unit 77 having received the request executes the license authentication processing, and determines (verifies) whether the input tenant ID and registration code are stored in the license information stored by the management information storage unit 91 (license information storage unit). When the input tenant ID and registration code are stored therein and if the registration status of the tenant ID is "Unregistered", then the license authenticating unit 77 determines that the input tenant ID and registration code are valid information (the input tenant ID (license) is authenticated).

The license authenticating unit 77 notifies the portal service application 61 of a result of license authentication. When the tenant ID and the registration code are valid, the portal service application 61 requests the setting registration unit 73 (registration unit) to register the tenant ID, the mail address, and the usage area information. The setting registration unit 73 registers (stores) the tenant ID, the mail address, and the usage area information in the tenant information of the management information storage unit 91 according to the request from the portal service application 61. When the setting registration unit 73 performs the registration, then the portal service application 61 generates a URL for formal registration as an access destination in order to display a screen for formal registration, composes a mail describing the URL for formal registration, and requests the mail transmission unit 74 to transmit the mail.

The mail transmission unit 74 transmits the mail using the mail address, as the destination, input by the user in the terminal device 14. When the mail is transmitted by the mail transmission unit 74, the portal service application 61 causes the display device 52 of the terminal device 14 to display a notification screen indicating the transmission of the mail. The generated URL for formal registration is managed based on the validity period elapsed since the generation (e.g., one hour). It is assumed that at least either one of the tenant ID and the registration code is not written in the mail.

Subsequently, the user accesses the URL for formal registration written in the mail received by the terminal device 14. The terminal device 14 used for the access in this case is not necessarily the same terminal device 14 as that used for the temporary registration. The access control unit 72 causes the terminal device 14 to access the portal service application 61 (portal service provision device 24). The portal service application 61 checks whether the access to the URL for formal registration is valid (whether the access is made to the generated URL for formal registration and is within the validity period). When the access is valid, then the portal service application 61 causes the display device 52 of the terminal device 14 to display a formal registration screen. The user operates the input device 51 of the terminal device 14 to perform an input for formal registration of the tenant ID, and then makes a request for the formal registration (Step S13).

The information to be input in the formal registration screen includes the tenant information such as the tenant ID, the name, and the registration code, and the user information such as the user ID and password for login, and the mail address. The portal service application 61 may display the formal registration screen in a state of previously inputting either one of the tenant ID and the registration code having been already input by the user upon the temporary registration. However, at least either one of the information to be input by the user, of the tenant ID and the registration code, is assumed not to be written in the mail to the URL for formal registration.

When the formal registration is requested from the terminal device 14 of the user, the portal service application 61 requests the license authenticating unit 77 to perform validation processing (formal registration processing) of the license based on the input tenant ID and registration code. The license authenticating unit 77 having received the request executes the license authentication processing. Specifically, the license authenticating unit 77 determines whether the input tenant ID and registration code are stored in the license information stored by the management information storage unit 91. When the tenant ID and the registration code are stored therein and if the registration status of the corresponding tenant ID is "Unregistered", the license authenticating unit 77 determines that the input tenant ID and registration code are valid information. When it is determined that the tenant ID and the registration code are valid, then the license authenticating unit 77 requests the status change of the license information to the setting registration unit 73.

The setting registration unit 73 changes the value of "status information" associated with the valid tenant ID and registration code to "Registered" in the license information stored by the management information storage unit 91. After the completion of the validation processing, the portal service application 61 requests the setting registration unit 73 to register the name and the user information input by the user in the terminal device 14. The setting registration unit 73 registers the name in the tenant information stored by the management information storage unit 91, and registers the tenant ID, the user ID and password for login, the mail address, and the like in the user information.

When the setting registration unit 73 completes the registration of settings of various pieces of information, the portal service application 61 composes a mail with a completion notification of organization registration, and requests the mail transmission unit 74 to transmit the mail. The mail transmission unit ?4 transmits the mail with the completion notification of organization registration to the mail address input by the user in the terminal device 14. The user then checks a completion screen of organization registration displayed on the display device 52 of the terminal device 14. In this way, the completion of registration of the tenant ID, the user ID, and the password enables the user to log in to the top screen of the portal site next time and to perform registration processing of the tenant information, the user information, and the device information associated with the tenant ID after the login.

The user (manager) operates the input device 51 of the terminal device 14 to input the tenant ID, the user ID, and the password from the top screen of the portal site and requests login. The portal service application 61 having received the request requests the user authentication to the user authenticating unit 78. The user authenticating unit 78 determines (verifies) whether the tenant ID, the user ID, and the password received from the terminal device 14 are stored in the user information of the management information storage unit 91, and authenticates the user when the received information is stored therein. When the user authenticating unit 78 authenticates the user, then the portal service application 61 allows the login.

Then the login user performs service registration of the service desired to be used (Step S14). In the case of performing the service registration, the user operates the input device 51 of the terminal device 14 to input the service ID from a service registration screen displayed on the display device 52 of the terminal device 14, and requests the service registration.

When the service registration is requested from the terminal device 14 of the user, the portal service application 61 acquires a license type (service type) associated with the license ID that coincides with the received service ID from the license information of the management information storage unit 91. Furthermore, the portal service application 61 acquires the usage area information associated with the tenant ID from the tenant information. The portal service application 61 then displays the terms of use (provisions) according to the license type and the usage area information on the display device 52 of the terminal device 14, and causes the user to select whether he/she agrees to the terms of use. In other words, the service provision system 20 holds terms of use (provisions) information according to countries or regions where it is used for each service (license type), and performs display control so as to display the terms of use according to the usage area information selected and input by the user.

When the user operates the input device 51 of the terminal device 14 to input the selection so as to agree to the terms of use, the portal service application 61 requests the license authenticating unit 77 to perform service registration processing based on the tenant ID and the service ID received from the terminal device 14. The license authenticating unit 77 checks (verifies) whether the service ID (license ID) received from the terminal device 14 is stored in the license information of the management information storage unit 91. When the service ID is stored therein, then the license authenticating unit 77 determines that the service ID is valid (the service ID is authenticated).

When it is determined that the service ID is valid, the license authenticating unit 77 requests the registration of the service ID to the setting registration unit 73. The setting registration unit 73 registers the service ID associated with the tenant ID received from the terminal device 14 in the tenant information stored by the management information storage unit 91.

Subsequently, the user performs device registration of the service ID (Step S15). The user operates the input device 51 of the terminal device 14 to input the service ID and the device ID of a device allowed to use the service by the input service ID from a device registration screen on the display device 52 of the terminal device 14, and requests the device registration of the service ID.

When the device registration of the service ID is requested from the terminal device 14 of the user, the portal service application 61 requests the license authenticating unit 77 to perform device registration processing of the service ID based on the tenant ID, the service ID, and the device ID received from the terminal device 14. The license authenticating unit 77 determines (verifies) whether the tenant ID and the service ID received from the terminal device 14 are stored in the tenant information of the management information storage unit 91. When the tenant ID and the service ID are stored therein, then the license authenticating unit 77 determines whether the registration status of the service ID (license ID) received from the terminal device 14 is "Unregistered" in the license information.

When the registration status is "Unregistered" (when the device registration of the service ID is not performed), the license authenticating unit 77 requests the device registration of the service ID to the setting registration unit 73. The setting registration unit 73 registers the tenant ID, the device ID, and the service ID which are received from the terminal device 14, and also the license information based on these IDs and information such as a service type, a start date of use, and an end date of use which are identified from the tenant information, in the device information of the management information storage unit 91.

Stored in the start date of use is, for example, a date on which the device registration is performed. Stored in the end date of use is a final date of a license period included in contract information when the start date of use of this record is set as starting point. However, the start date of use can be specified when the start of use of the license is requested. In this case, the start date of use specified when the start of use of the license is requested may be stored in the start date of use of this record.

When the device registration of the service ID is completed, the setting registration unit 73 further changes the registration status in the license information of the service ID for which device registration is performed to "Registered". Thereafter, the user operates the input device 51 of the terminal device 14 and enables registration of an available option in the registered service.

Data Processing Function

Figure 12:
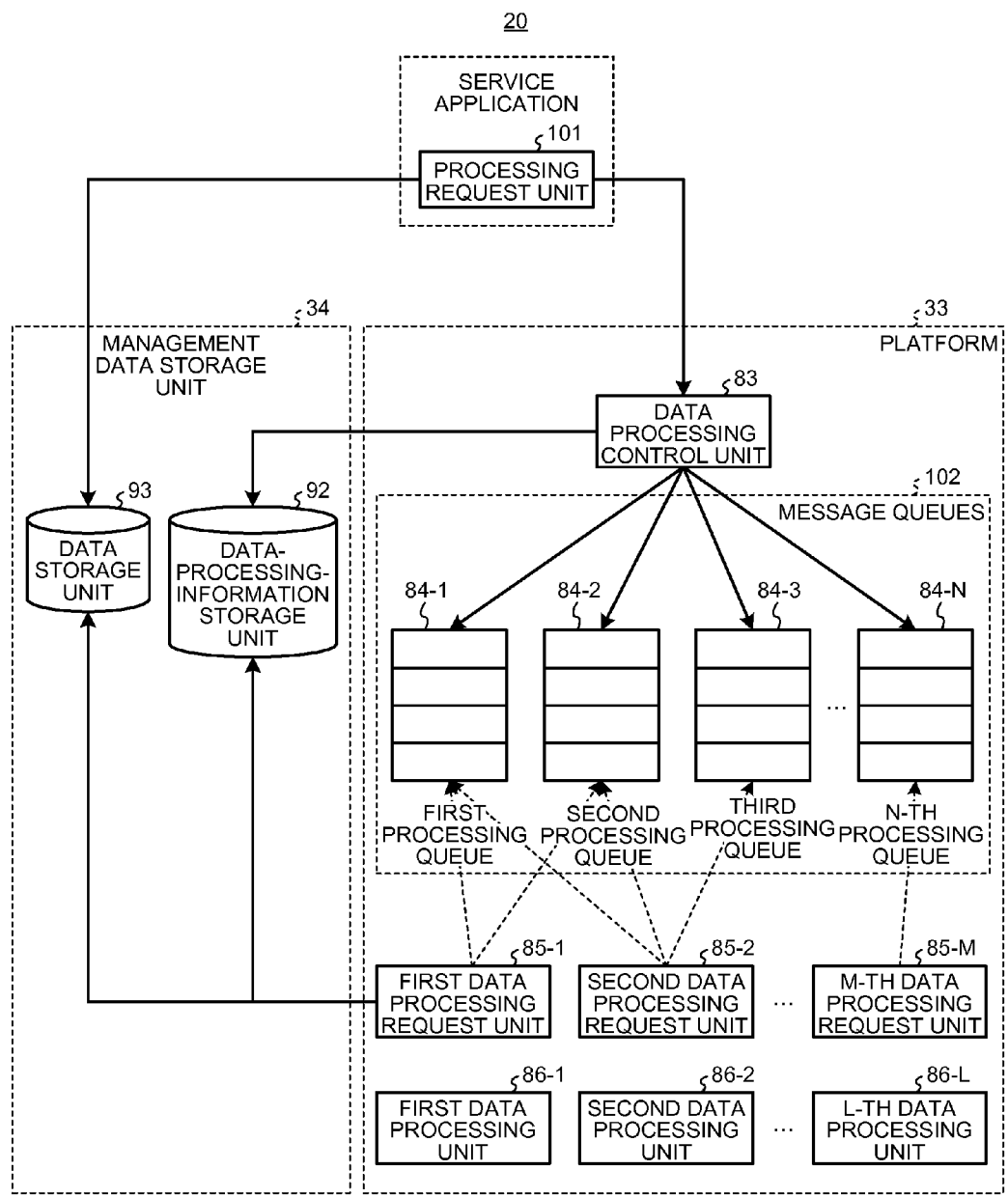
FIG. 12 is a data flow diagram when data processing is performed in the service provision system 20.
Figure 13:
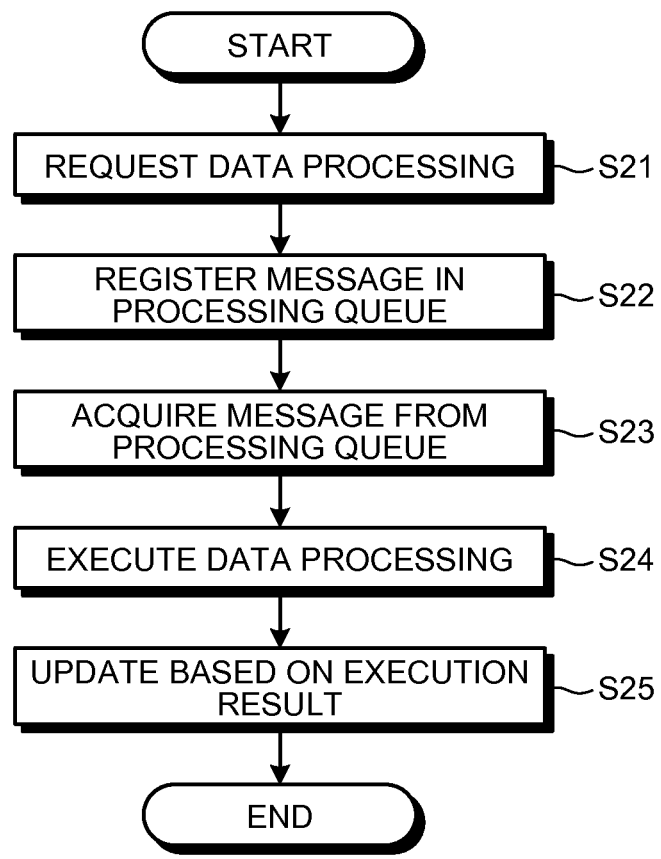
FIG. 13 is a flow diagram of data processing in the service provision system 20.

FIG. 12 is a data flow diagram when data processing is performed in the service provision system 20. FIG. 13 is a flow diagram of data processing in the service provision system 20.

In the service provision system 20, the processing of executing various data processings will be explained below, the data processings being requested from the service applications to the data processing control unit 83 (data processing control unit), the processing queues 84 (execution request storage units), the data processing request units 85, and the data processing units 86 (data processing units) which are provided in the platform 33. The processing queues 84 form a message queue 102.

Each of the service applications includes a processing request unit 101. First of all, the processing request unit 101 of the service application records processing target data (data to be processed such as application data and image data) in the data storage unit 93, and transmits a data transmission request (may be called "request") being the execution request information to the data processing control unit 83 (Step S21). The request includes processing contents of data processing and information of the storage device as a recording destination of the processing target data (e.g., URI).

The data processing control unit 83 analyzes the received request, registers the message in the processing queue 84 according to the processing content in the message queue 102, and also registers the request in the data-processing-information storage unit 92 (Step S22). The request includes a recording destination of data, a processing content of the data processing, and a status of the request. The status of the request includes "reception", "in execution", "completion", and the like. The status of the request represents a status indicating a processing status of data processing. The status of the request is a status of "reception" when the data processing control unit 83 registers the request.

Each of the data processing request units 85 is assigned with one processing queue 84 or with a plurality of processing queues 84. Each of the data processing request units 85 monitors the assigned processing queue 84, and acquires a message registered in the processing queue 84 (Step S23).

In the example of FIG. 12, a first data processing request unit 85-1 monitors a "first processing queue 84-1" and a "second processing queue 84-2". A second data processing request unit 85-2 monitors the "first processing queue 84-1", the "second processing queue 84-2", and a "third processing queue 84-3". An M-th (M=2 or more integer) data processing request unit 85-M monitors an "N-th (N=2 or more integer) processing queue 84-N". How to be assigned can be set or changed as necessary.

Each of the data processing units 86 executes data processing. Each of the data processing units 86 may execute data processing different from that of the other data processing units 86, or may execute the same data processing. Each of the data processing request units 85 acquires a request from the data-processing-information storage unit 92 based on the message acquired from the assigned processing queue 84. Each of the data processing request units 85 causes the data processing unit 86 corresponding to the data processing indicated in the request to execute the requested processing (Step S24). For example, each of the data processing request units 85 causes any one of the first to an L-th (L=2 or more integer) data processing units 86-1 to 86-L to execute the data processing.

Subsequently, each of the data processing request units 85 receives an execution result of the processing executed by the data processing unit 86. Each of the data processing request units 85 updates the request from the execution result (such that the executed processing is deleted from the request and the status is changed if the status of the request is changed), and registers the updated request in the data-processing-information storage unit 92. Each of the data processing request units 85 registers the message in the corresponding processing queue 84 if there is any data processing to be executed next (Step S25).

When the data processing is performed on the acquired processing target data and the processing target data between before and after the processing are thereby changed from each other, the data processing unit 86 records the processing target data after the processing in the data storage unit 93, and contains the recording destination of the processing target data after the processing in the request.

Some specific examples of the data processing executed by each of the data processing units 86 will be exemplified herein. The contents of the data processing are not limited to the specific examples.

The data processing unit 86 executes distribution processing for transmitting data to the online storage 42. The data processing unit 86 also executes reception processing for receiving data from the online storage 42. Furthermore, the data processing unit 86 executes distribution processing for transmitting a mail to the mail server 41. The data processing unit 86 also executes reception processing for receiving a mail from the mail server 41.

The data processing unit 86 executes processing (OCR processing) for recognizing characters in image data to generate text data. The data processing unit 86 executes conversion processing for converting image data into another data format (e.g., PDF processing for converting data into PDF data). The data processing unit 86 executes conversion processing for converting document data to page description language (PDL) data. The data processing unit 86 executes correction processing of image data. The correction processing includes, as examples, tilt correction, removal of noise, punch hole, and the like, top and bottom identification, resolution conversion, and removal of white paper. The data processing unit 86 executes recognition processing of barcode included in the image data and processing of dividing a document into parts using a form with barcode as a divider. The data processing unit 86 executes archiver processing for compressing image data to, for example, a Zip format. The data processing unit 86 executes flow branching processing for branching processing subsequently performed or a distribution destination depending on conditions. The data processing unit 86 executes image conversion for converting between image formats of image data. The data processing unit 86 executes document information replacement for replacing between bibliographic information according to conditions. The data processing unit 86 executes table replacement for replacing between tables included in the bibliographic information according to conditions. The data processing unit 86 executes session specification input processing for selecting and distributing an only arbitrary page. The data processing unit 86 executes style sheet transformation for transforming an output format of the bibliographic information from an Extensible Markup Language (XML) to an Extensible Stylesheet Language (XSL).

The data processing unit 86 executes mail composition processing. The data processing unit 86 executes storage processing for storing data in a predetermined storage area. The data processing unit 86 executes monitoring processing for monitoring whether the data is stored in a predetermined folder of the online storage 42.

The data processing unit 86 executes deletion processing for deleting the request indicating deletion, of the messages registered in the processing queues 84. The data processing unit 86 executes priority processing for causing a corresponding data processing unit 86 to preferentially process the request indicating priority, of the requests registered in the processing queues 84. The data processing unit 86 executes error processing when the data processing performed on the request fails.

User Authentication and Device Authentication Functions

Figure 14:
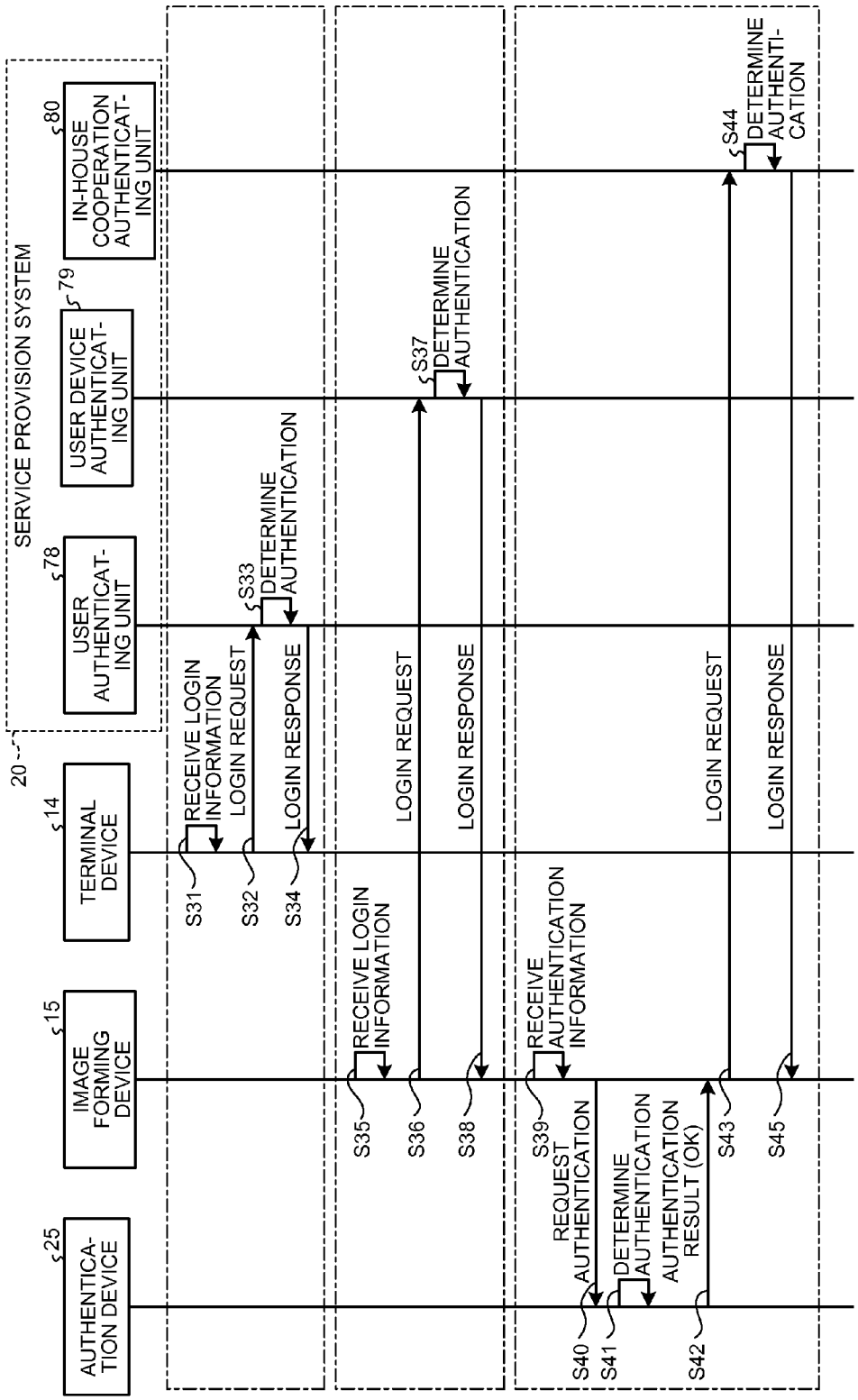
FIG. 14 is a sequence diagram of authentication processing.

FIG. 14 is a sequence diagram of authentication processing.

When the user is to perform authentication from the terminal device 14, the terminal device 14 displays an input screen to which the tenant ID and the user ID and password for login to the service provision system 20 are input, and receives the login information (Step S31). When the user inputs the login information (the tenant ID and the user ID and password for login) and requests login to the service provision system 20, the terminal device 14 transmits an authentication request of the input login information (request for user device authentication) to the service provision system 20 (Step S32). The access control unit 72 of the service provision system 20 receives the login information from the terminal device 14 and requests the authentication to the user authenticating unit 78.

The user authenticating unit 78 checks whether a combination of the tenant ID and the user ID and password for login, which are received from the terminal device 14, is included in the user information stored by the management information storage unit 91. When the combination is included therein, then the user authenticating unit 78 determines that the user authentication is successful (Step S33). When the combination is not included therein, then the user authenticating unit 78 determines that the user authentication fails. When the user authentication is successful, the user authenticating unit 78 allows the login to the service provision system 20 (login for using the service). The access control unit 72 sends back a login response indicating the authentication result to the terminal device 14 (Step S34).

The image forming device 15 stores setting as to whether to use the user ID (first user identification information) and password (first user authentication information) for login or to use the user ID for in-house authentication (second user identification information) in order for login to the service provision system 20. The manager or the like can change the setting as necessary. The image forming device 15 stores the tenant ID (organization authentication information) and the device ID (device identification information) in its own storage area.

When the user is to perform authentication from the image forming device 15 and if the setting is made to use the user ID (first user identification information) and password (first user authentication information) for login, then the image forming device 15 displays an input screen to which the user ID and password for login to the service provision system 20 are input, and receives the login information (Step S35). When the user inputs the login information (the user ID and password for login) and requests login to the service provision system 20, the image forming device 15 transmits an authentication request (request for user device authentication) of the input login information and the stored tenant ID and device ID (device authentication information) to the service provision system 20 (Step S36). The access control unit 72 (authentication information receiving unit) of the service provision system 20 receives these pieces of information from the image forming device 15, and requests the authentication to the user device authenticating unit 79 (authentication unit).

The user device authenticating unit 79 checks whether a combination of the tenant. ID and the device ID, which are received from the image forming device 15, is included in the device information stored by the management information storage unit 91. When the combination is included therein, then the user device authenticating unit 79 determines that the device authentication is successful (Step S37). When the combination of the tenant ID and the device ID is not included therein, then the user device authenticating unit 79 determines that the device authentication fails. The user device authenticating unit 79 further checks whether a combination of the tenant ID and the user ID and password for login, which are received from the image forming device 15, is included in the user information stored by the management information storage unit 91. When the combination is included therein, then the user device authenticating unit 79 determines that the user authentication is successful. When the combination of the tenant ID and the user ID and password for login is not included therein, then the user device authenticating unit 79 determines that the user authentication fails. When the device authentication and the user authentication are successful, then the user device authenticating unit 79 allows the login to the service provision system 20 (login for using services). The access control unit 72 then sends back a login response indicating the authentication result to the image forming device 15 (Step S38).

When the user is to perform authentication from the image forming device 15 and if the setting is made to use the user ID for in-house authentication (second user identification information), then the user executes the user authentication in the image forming device 15. The user authentication is executed to use the image forming device 15 or to use a specific function of the image forming device 15. An example in which the authentication device 25 performs user authentication using a card ID carried by the user is explained herein.

First of all, the user causes a card reader connected to the image forming device 15 to read the card ID (Step S39). At this time, the user may also input the password (second user authentication information). The image forming device 15 transmits the card ID read by the card reader to the authentication device 25, and requests user authentication (Step S40). The authentication device 25 previously stores the user authentication information associated with the card ID and the user ID in the storage area, and checks whether the user ID and password associated with the received card ID can be identified. When the user ID can be identified, the authentication device 25 determines that the user authentication is successful (Step S41). The authentication device 25 transmits the identified user ID with the authentication result indicating successful authentication to the image forming device 15 (Step S42).

Subsequently, when the user requests a login to the service provision system 20 (e.g., the user selects login to the service provision system 20 from the display screen), the image forming device 15 transmits an authentication request (request for in-house cooperation authentication) of the identified user ID and the stored tenant ID and device ID (device authentication information) to the service provision system 20 (Step S43). The access control unit 72 (authentication information receiving unit) receives these pieces of information from the image forming device 15, and requests authentication to the in-house cooperation authenticating unit 80 (authentication unit).

The in-house cooperation authenticating unit 80 checks whether a combination of the tenant ID and the device ID, which are received from the image forming device 15, is included in the device information stored by the management information storage unit 91. When the combination is included therein, then the in-house cooperation authenticating unit 80 determines that the device authentication is successful (Step S44). When the combination of the tenant ID and the device ID is not included therein, then the in-house cooperation authenticating unit. 80 determines that the device authentication fails. The in-house cooperation authenticating unit 80 further checks whether a combination of the tenant ID and the user ID for in-house authentication, which are received from the image forming device 15, is included in the user information stored by the management information storage unit 91. When the combination is included therein, then the in-house cooperation authenticating unit 80 determines that the user authentication is successful. When the combination of the tenant ID and the user ID for in-house authentication is not included therein, then the in-house cooperation authenticating unit 80 determines that the user authentication fails. When the device authentication and the user authentication are successful, then the in-house cooperation authenticating unit 80 allows the login to the service provision system 20 (login for using services). The access control, unit 72 then sends back a login response indicating the authentication result to the image forming device 15 (Step S45).

When the in-house cooperation authenticating unit 80 determines that the device authentication is successful but the user authentication is unsuccessful, the service provision system 20 may transmit screen information of a screen, to which the user ID and password for login are input, to the image forming device 15 and cause the image forming device 15 to display the input screen. In this case, when the user inputs the user ID and password for login and requests the login again, then the image forming device 15 transmits the input user ID and password for login to the user device authenticating unit 79 of the service provision system 20, and requests login. The user device authenticating unit 79 checks whether the combination of the tenant ID and the user ID and password for login, which are received from the image forming device 15, is included in the user information stored by the management information storage unit 91. When the combination is included therein, then the user device authenticating unit 79 determines that the user authentication is successful, and allows the login to the service provision system 20. Moreover, the setting registration unit 73 registers the user ID for in-house authentication received from the image forming device 15 in association with the tenant ID and the user ID and password for login, which are received from the image forming device 15, included in the user information stored by the management information storage unit 91 as a result of the successful login. By thus doing, when the user is to log in from the image forming device 15 next time, the user can log in using the user ID for in-house authentication.

Cooperation With Online Storage 42 Authorization Setting

Figure 15:
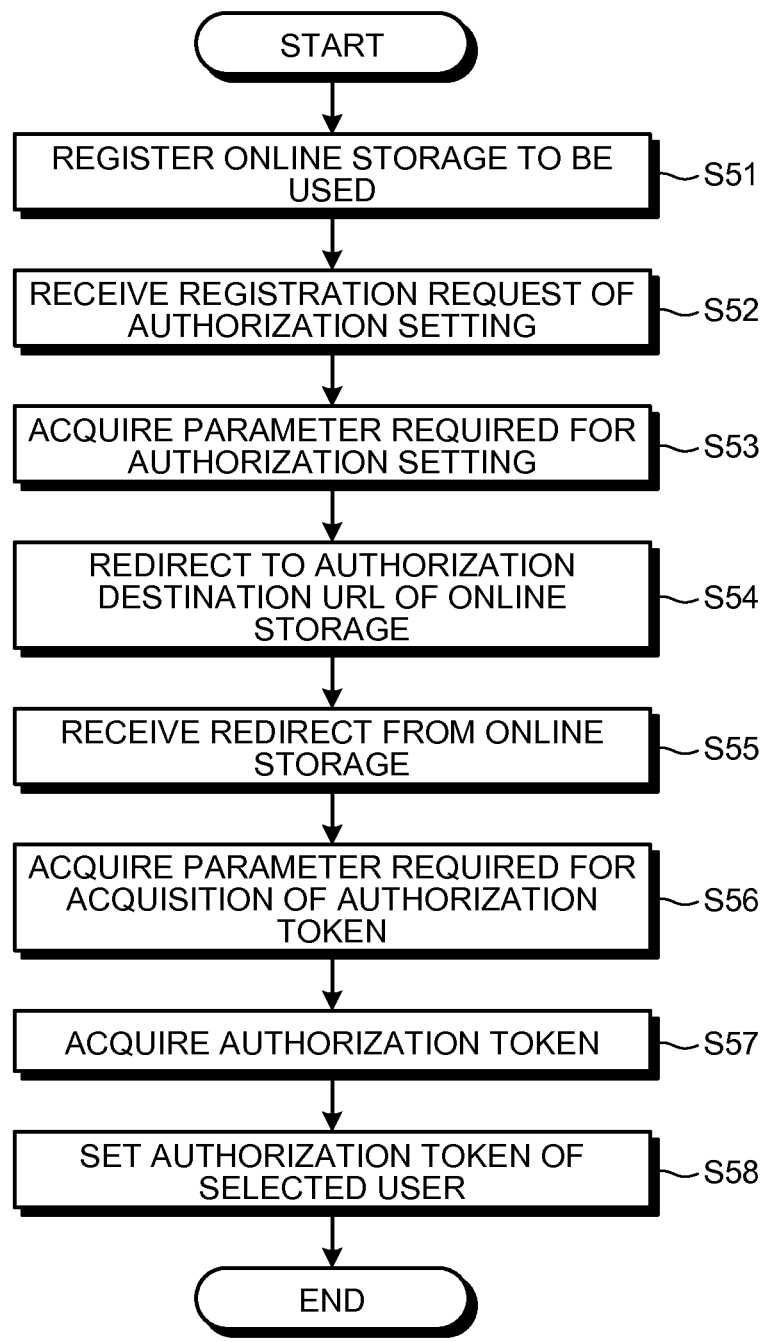
FIG. 15 is a diagram of a processing flow when an access is made to an online storage 42.

FIG. 15 is a diagram of a processing flow when an access is made to the online storage 42.

The manager (user) operates the input device 51 of the terminal device 14 to log in to the service provision system 20, and selects a desired online storage 42 (external service) from a list of external services stored in the external service information of the management information storage unit 91 on the registration screen of the external services displayed on the display device 52 of the terminal device 14. When the user selects any one of online storages 42, the terminal device 14 requests registration of the selected online storage 42 to the in-house cooperation authenticating unit 80.

The portal service application 61 having received the registration request requests the registration of the selected online storage 42 to the setting registration unit 73. The setting registration unit 73 registers the selected online storage 42 associated with the tenant ID of the manager in the tenant information of the management information storage unit 91 (Step S51).

The manager selects an user ID of the user to which authorization setting is desired to be applied, an external service ID for performing the authorization setting (or a service name of an external service), and a scope to be set to the user on an authorization setting screen of the portal site. These pieces of information are selected, and the terminal device 14 thereby requests registration of the authorization setting to the service provision system 20. The portal service application 61 receives the request of the authorization setting (Step S52).

The portal service application 61 having received the request of the authorization setting requests the authorization setting to the authorization setting processing unit 75. The authorization setting processing unit 75 acquires a parameter required for the authorization setting from the external service information of the management information storage unit 91 (Step S53). The parameter required for authorization setting includes a client ID associated with the selected external service ID, a redirect destination URL, and an arbitrary session key to maintain a session, in addition to the user ID, the external service ID, and the scope selected by the manager.

The authorization setting processing unit 75 having acquired the parameter required for the authorization setting acquires an authorization destination URL associated with the selected external service ID from the external service information of the management information storage unit 91. The authorization setting processing unit 75 redirects the request including the parameter required for setting (request in which the parameter required for setting is the query of a GET request) from the terminal device 14 to the authorization destination URL (Step S54).

By redirecting the request, the authorization setting is performed between the terminal device 14 and the online storage 42. After the authorization setting, the request is further redirected from the online storage 42 to the authorization setting processing unit 75. This causes the session at hypertext transfer protocol (HTTP) level to be discontinued between the terminal device 14 and the online storage 42. Therefore, the terminal device 14 and the online storage 42 use session keys in order to maintain the same session.

The redirected online storage 42 displays the login screen on the terminal device 14. The manager requests a login to the online storage 42 from the login screen of the terminal device 14. When the login is successful, the online storage 42 displays an authorization screen on the terminal device 14. The manager checks the authorization screen, and operates the terminal device 14, when authorization is to be performed, to request authorization (e.g., depresses an authorize button displayed on the authorization screen). The online storage 42 having received the request of the authorization setting registers the authorization, and redirects an authorization code indicating that the authorization is allowed and a session key from the terminal device 14 to a redirect destination URL. Through this redirect, the authorization setting processing unit 75 of the service provision system 20 receives the authorization code (Step S55). When the manager has already logged in at the time of redirect to the online storage 42, the display of the login screen is omitted.

The authorization setting processing unit 75 having received the authorization code acquires a parameter required for acquiring an authorization token from the external service information of the management information storage unit 91 (Step S56). The parameter required for acquiring an authorization token is a received authorization code. The required parameter includes, as examples, a client ID and client secret associated with the external service ID of the online storage 42 that transmits the authorization code.

Subsequently, the authorization setting processing unit 75 transmits the acquired client ID and client secret and the received authorization code to the online storage 42, and requests acquisition of the authorization token (Step S57). The online storage 42 verifies the received authorization token and transmits the authorization token to the authorization setting processing unit 75 of the service provision system 20. The authorization setting processing unit 75 having received the authorization token requests registration of the authorization token to the setting registration unit 73 (Step S58). The setting registration unit 73 registers the authorization token and the scope for the selected user in the user information of the management information storage unit 91. When the registration of the authorization token is completed, the authorization setting processing unit 75 notifies the portal service application 61 of the registration completion. The portal service application 61 displays the screen indicating the setting result of the authorization setting on the terminal device 14.

The online storage 42 may also transmit, when transmitting the authorization token to the service provision system 20, the validity period of the authorization token along with a refresh token in order to reissue an authorization token in the case of expiration of the validity period.

Cooperation processing with an external service (online storage 42 or so) will further be explained next. When the user logs in to the service provision system 20 and requests a cooperation processing with the external service using the service provision system 20 through the terminal device 14 or the image forming device 15, the external cooperation authenticating unit 81 performs the login processing to the external service.

When receiving the login request to a specified external service (online storage 42) from, for example, the data processing request unit 85 (or the data processing unit 86), the external cooperation authenticating unit 81 acquires information (third user authentication information) required for the login processing to the specified external service (online storage 42) associated with the user having logged in to the service provision system 20 (specifically, associated with the tenant ID and the user ID and password for login of the user having logged in). For example, if the login is made to Online Storage A illustrated in FIG. 6, the external cooperation authenticating unit 81 acquires an account and password of the online storage A, and acquires, if the login is made to Online Storage B, an account and an authorization token of the online storage B.

When the cooperating external service is an external service for which authorization setting is not performed as is the online storage A illustrated in FIG. 6, and that performs only the login processing, the external cooperation authenticating unit 81 transmits a login request with the acquired account and password (authentication information for the external service) to the online storage A. The online storage A receives the login request and performs authentication on the received account and password. The online storage A having received the login request transmits a response indicating that the login is permitted when the authentication is successful, and transmits a response indicating that the login is not permitted when the authentication fails, to the external cooperation authenticating unit 81.

The external cooperation authenticating unit 81 receives the response indicating the permission of the login from the online storage A, and this enables the service provision system 20 to upload (store) the data to, for example, the online storage A or to download (acquire) the data from the online storage A.

When the cooperating external service is an external service for which authorization setting is performed as is the online storage B illustrated in FIG. 6, the external cooperation authenticating unit 81 transmits the login request with the acquired account (authentication information for the external service) to the online storage B. The online storage B receives the login request and performs authentication on the received account and password, transmits a response indicating that the login is permitted when the authentication is successful, and transmits a response indicating that the login is not permitted when the authentication fails, to the external cooperation authenticating unit 81.

The external cooperation authenticating unit 81 receives the response indicating the permission of the login from the online storage B, and this enables the service provision system 20 to request the processing to the online storage B using the authorization token within an authorized and set scope of the usage (scope of authority).

Setting Processing of Workflow

Figure 16:
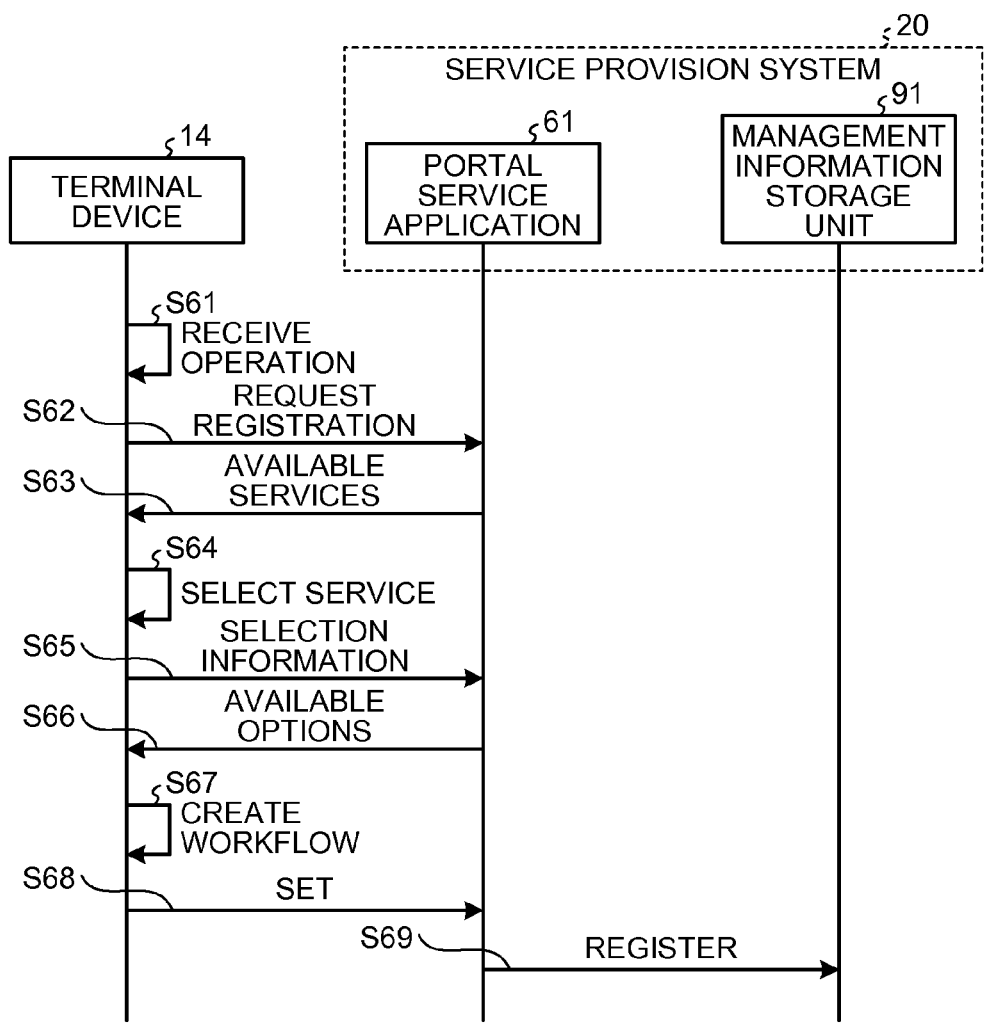
FIG. 16 is a sequence diagram of registration processing of a workflow.

FIG. 16 is a sequence diagram of registration processing of a workflow. When a workflow is registered in the image forming device 15, the processing is executed according to the sequence of FIG. 16.

The terminal device 14 displays the service registration screen after the completion of the login to the service provision system 20, and receives an operation of starting registration of the service from the user (manager) (Step S61). When the user instructs to start the registration of service on the service registration screen, the terminal device 14 transmits a registration request to the service provision system 20 (Step S62).

When receiving the registration request from the terminal device 14, the portal service application 61 transmits the screen, which displays a list of available services, stored in the management information storage unit 91 associated with the tenant ID of the organization to which the user belongs, to the terminal device 14 (Step S63). The terminal device 14 displays the screen displaying the list of the received services and receives an operation of selecting a service sent from the user (Step S64). When the user selects any one of the services on the screen displaying the list of the services, the terminal device 14 transmits selection information of the service to the service provision system 20 (Step S65).

Subsequently, the portal service application 61 transmits a screen displaying a list of data processings capable of addition stored in association with the selected service in the management information storage unit 91 to the terminal device 14 (Step S66). The terminal device 14 displays the list of the received data processings and receives a user operation of creating a workflow (Step S67). The data processing capable of addition includes processing such as optical character recognition (OCR processing), conversion of file format (e.g., PDF processing), image correction, and barcode reading.

The user operates the terminal device 14 to create a workflow that defines an execution sequence of data processing. Upon completion of creation of the workflow, the terminal device 14 transmits the setting information of the workflow to the service provision system 20 (Step S68). When receiving the setting information of the workflow, the portal service application 61 registers the setting information of the workflow associated with the service in the management information storage unit 91 (Step S69).

One Example of Workflow

Figure 17:
FIG. 17 is a diagram of an example of the workflow.

FIG. 17 is a diagram of an example of the workflow. The service provision system 20 executes data processing according to, for example, the workflow as illustrated in FIG. 17.

When receiving, for example, the image data captured by the image forming device 15, the service provision system 20 executes, for example, the OCR processing as a first processing. This enables the service provision system 20 to generate text data from the image data.

Subsequently, the service provision system 20 performs the PDF processing as a second processing. This enables the service provision system 20 to convert the image data to PDF data. Then, the service provision system 20 distributes the PDF data and the text data to the previously registered online storage 42 as a third processing.

The service provision system 20 can collectively execute a plurality of data processings in the above manner, thus improving work efficiency.

Sequence Upon Execution of Workflow

Figure 18:
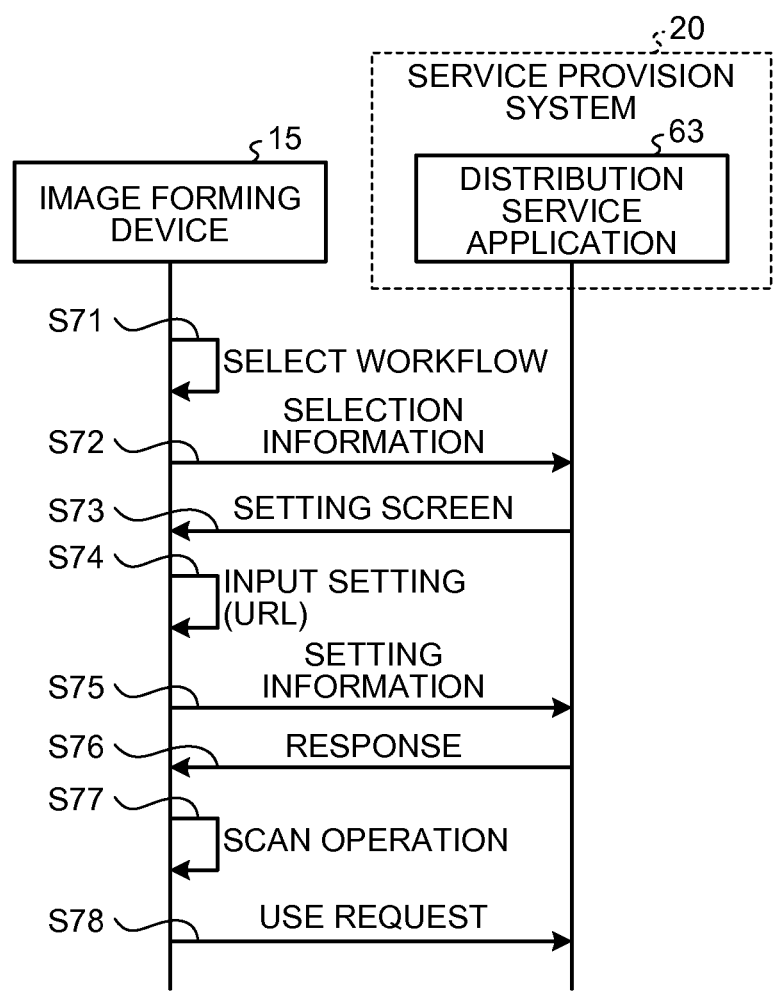
FIG. 18 is a sequence diagram upon execution of the workflow.

FIG. 18 is a sequence diagram upon execution of the workflow. When any one of services provided to the image forming device 15 is to be used, at first, the user operates the display screen of the image forming device 15 to select a workflow (Step S71). When the user selects a workflow, the image forming device 15 transmits selection information indicating the selected workflow to the service provision system 20 (Step S72).

The service provision system 20 activates a service application specified by the selection information. The distribution service application 63 is activated herein. The distribution service application 63 transmits a setting screen for various pieces of information required for execution of the data processing included in the selected workflow to the image forming device 15, and causes the image forming device 15 to display the setting screen (Step S73). For example, the distribution service application 63 causes the image forming device 15 to display the setting screen for setting a URL of the online storage 42 as a data distribution destination.

Subsequently, the user inputs required information to the setting screen (Step S74). Then the image forming device 15 transmits the setting information input by the user (e.g., a URL of the online storage 42) to the service provision system 20 (Step S75). When receiving the setting information, the distribution service application 63 transmits a response screen to the image forming device 15, and causes the image forming device 15 to display the response screen (Step S76).

The user then presses a scan start button or so to cause the image forming device 15 to scan (Step S77). The image forming device 15 executes scan, and transmits image data acquired by the scan and a service use request to the service provision system 20 (Step S78).

Figure 19:
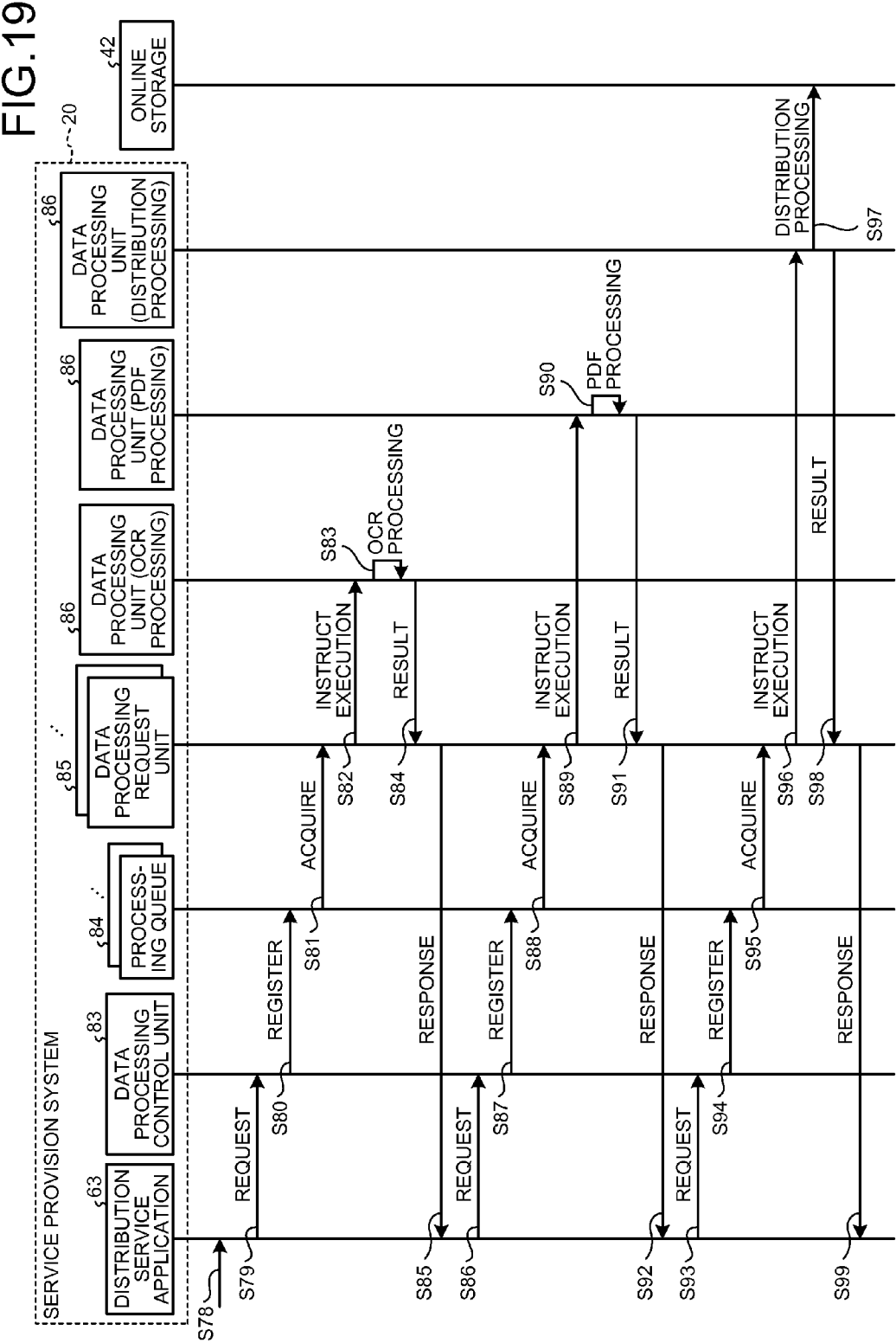
FIG. 19 is a sequence diagram continued from FIG. 18.

FIG. 19 is a sequence diagram continued from FIG. 18. When receiving the service use request from the image forming device 15 (Step S78), the distribution service application 63 causes data processing units 86 in charge to sequentially execute respective data processings defined in the selected workflow.

For example, when the workflow illustrated in FIG. 17 is selected, the distribution service application 63 transmits a request of OCR processing to the data processing control unit 83 (Step S79). When receiving the request, the data processing control unit 83 analyzes the request and registers a message in a corresponding processing queue 84 (Step S80). The message registered in the processing queue 84 is temporarily stored. When the data processing unit 86 in charge of the OCR processing becomes capable of processing, the data processing request unit 85 in charge of the OCR processing acquires the message registered in the corresponding processing queue 84 (Step s81). The data processing request unit 85 in charge of the OCR processing instructs the data processing unit 86 in charge of the OCR processing to execute the OCR processing indicated in the acquired message (Step S82). When receiving the instruction of the execution, the data processing unit 86 in charge of the OCR processing executes the OCR processing (Step S83). After the completion of the processing, the data processing unit 86 in charge of the OCR processing sends back an execution result to the data processing request unit 85 in charge of the OCR processing (Step 584). The data processing request unit 85 in charge of the OCR processing then sends back a response message to the distribution service application 63 (Step S85).

Subsequently, the distribution service application 63 transmits a request of the PDF processing to the data processing control unit 83 (Step S86). When receiving the request, the data processing control unit 83 analyzes the request and registers a message in a corresponding processing queue 84 (Step S87). The message registered in the processing queue 84 is temporarily stored. When the data processing unit 86 in charge of the PDF processing becomes capable of processing, the data processing request unit 85 in charge of the PDF processing acquires a message registered in the corresponding processing queue 84 (Step 588). The data processing request unit 85 in charge of the PDF processing instructs the data processing unit 86 in charge of the PDF processing to execute the PDF processing indicated in the acquired message (Step S89). When receiving the instruction of the execution, the data processing unit 86 in charge of the PDF processing executes the PDF processing (Step S90). After the completion of the processing, the data processing unit 86 in charge of the PDF processing sends back an execution result to the data processing request unit 85 in charge of the PDF processing (Step S91). The data processing request unit 85 in charge of the PDF processing then sends back a response message to the distribution service application 63 (Step S92).

Subsequently, the distribution service application 63 transmits a request of distribution processing to the data processing control unit 83 (Step S93). When receiving the request, the data processing control unit 83 analyzes the request and registers a message in a corresponding processing queue 84 (Step S94). The message registered in the processing queue 84 is temporarily stored. When the data processing unit 86 in charge of the distribution processing becomes capable of processing, the data processing request unit 85 in charge of the distribution processing acquires the message registered in the corresponding processing queue 84 (Step S95). The data processing request unit 85 in charge of the distribution processing instructs the data processing unit 86 in charge of the distribution processing to execute the distribution processing indicated in the acquired message (Step S96). When receiving the instruction of the execution, the data processing unit 86 in charge of the distribution processing executes the distribution processing to the online storage 42 of a set URL (Step S97). After the completion of the processing, the data processing unit 86 in charge of the distribution processing sends back an execution result to the data processing request unit 85 in charge of the distribution processing (Step S98). Then the data processing request unit 85 in charge of the distribution processing sends back a response message to the distribution service application 63 (Step S99).

As explained above, according to the service provision system 20, the service for performing data processing according to the workflow can be provided to the device such as the image forming device 15 via the network under an environment used by a large number of unspecified users such as cloud services.

Mail Distribution Service

Figure 20:
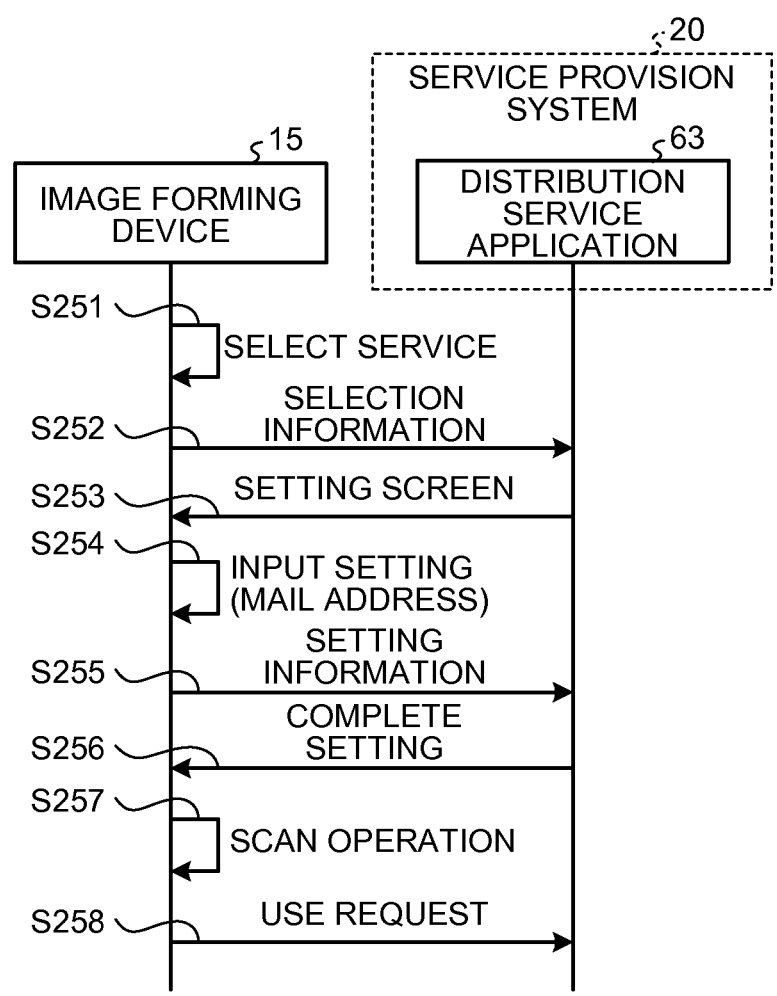
FIG. 20 is a sequence diagram upon execution of a mail distribution service.
Figure 21:
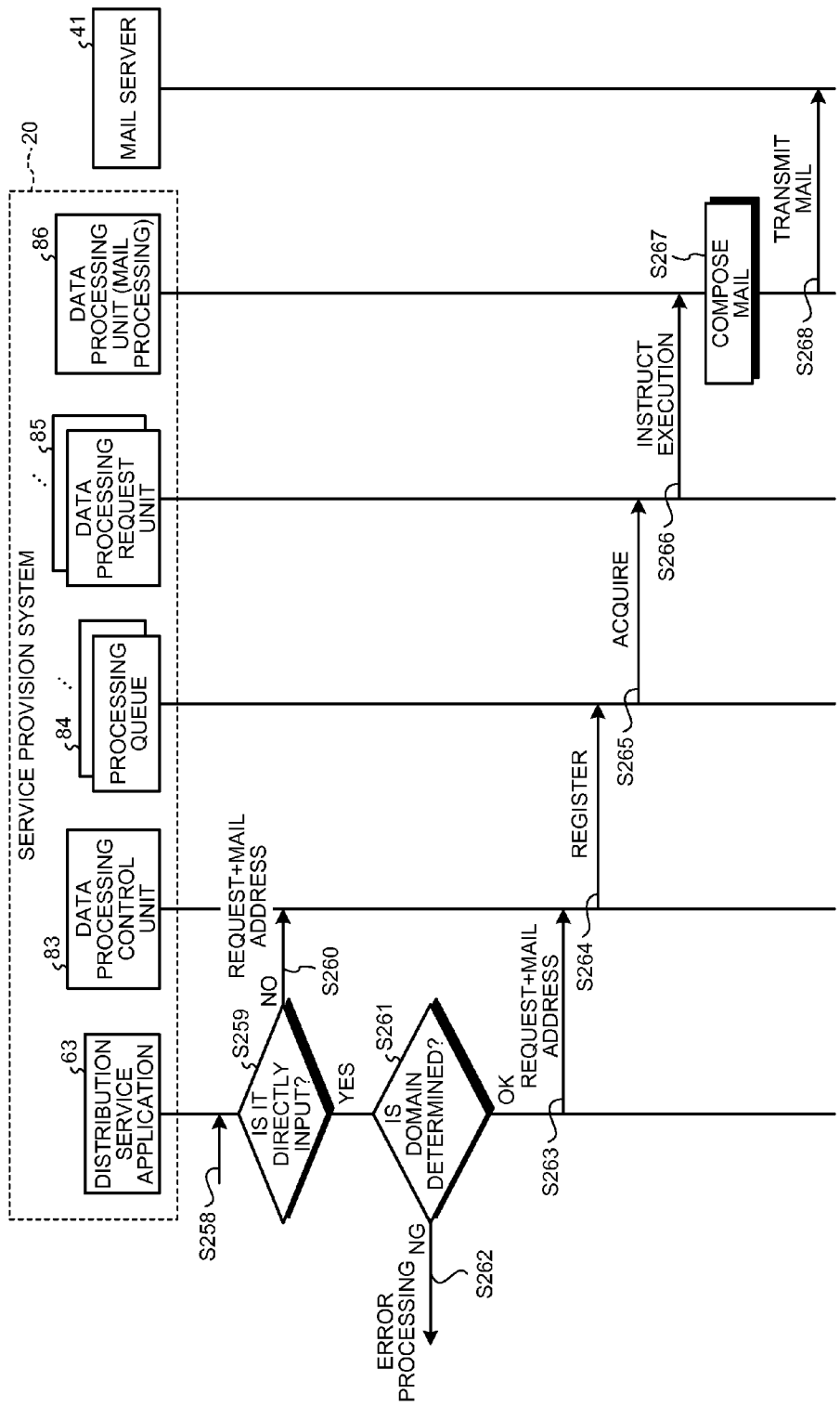
FIG. 21 is a sequence diagram continued from FIG. 20.

FIG. 20 and FIG. 21 are sequence diagrams upon execution of a mail distribution service. The service provision system 20 can provide a mail distribution service for distributing data obtained by scanning with the image forming device 15 by mail. When the mail distribution service is to be provided, the processing is performed in the sequence illustrated in FIG. 20 and FIG. 21.

First of all, the user operates the display screen of the image forming device 15 to select a service (Step S251). The mail distribution service is selected herein. When the user selects the service, the image forming device 15 transmits selection information indicating the selected service to the service provision system 20 (Step S252).

The service provision system 20 activates a service application corresponding to the selection information. The distribution service application 63 is activated herein. The distribution service application 63 transmits a setting screen for various pieces of information required for executing the selected service to the image forming device 15 and causes the image forming device 15 to display the setting screen (Step S253).

In the present example, the distribution service application 63 causes the image forming device 15 to display the setting screen for setting a mail address. In this case, the distribution service application 63 causes the image forming device 15 to display a list of previously registered mail addresses and display the setting screen so as to prompt the user to select a mail address as a destination from the list. Instead of this sequence, the distribution service application 63 may cause the image forming device 15 to display the setting screen so as to prompt the user to directly input a mail address in text.

The user then inputs required information to the setting screen (Step S254). In the present example, the user either selects the mail address from the list or directly inputs the mail address.

Subsequently, the image forming device 15 transmits the setting information input by the user to the service provision system 20 (Step S255). When receiving the setting information, the distribution service application 63 transmits a setting completion screen to the image forming device 15 and causes the image forming device 15 to display the setting completion screen (Step S256).

When the setting completion screen is displayed, the user then presses the scan start button and causes the image forming device 15 to perform scanning (Step S257). The image forming device 15 performs the scanning and transmits a service use request to the service provision system 20 (Step S258). At this time, the image forming device 15 also transmits the image data obtained by scanning to the service provision system 20.

When receiving the service use request from the image forming device 15 (Step S258 of FIG. 21), the distribution service application 63 determines whether the mail address is directly input by the user (Step S259). When the mail address is not directly input, that is, when the mail address is selected from the list (No at Step S259), then the distribution service application 63 transmits a request of distribution processing to the data processing control unit 83 (Step S260). At this time, the distribution service application 63 includes the mail address in the request.

When the mail address is directly input (Yes at Step S259), the distribution service application 63 determines whether a domain of the input address is an authorized domain (Step S261). In this case, the distribution service application 63 may determine whether the domain of the input mail address is a prohibited domain.

When the domain of the input mail address is not an authorized domain or is a prohibited domain (NG at Step S261), the distribution service application 63 causes the image forming device 15 to execute error processing (Step S262). When the domain of the input mail address is an authorized domain or is not a prohibited domain (OK at Step S261), the distribution service application 63 transmits a request of distribution processing to the data processing control unit 83 (Step S263). At this time, the distribution service application 63 includes the mail address in the request.

When receiving the request (Steps S260, S263), the data processing control unit 83 analyzes the request and registers a message in a corresponding processing queue 84 (Step S264). The message registered in the processing queue 84 is temporarily stored. When a data processing unit 86 in charge of mail processing becomes capable of processing, a data processing request unit 85 in charge of mail processing acquires the message registered in the corresponding processing queue 84 (Step S265). The data processing request unit 85 in charge of the mail processing instructs the data processing unit 86 in charge of the mail processing to execute the mail processing indicated in the acquired message (Step S266).

When receiving the instruction of the execution, the data processing unit 86 in charge of the mail processing composes electronic mail (e-mail) including the image data obtained by scanning (Step S267). At this time, the data processing unit 86 in charge of the mail processing sets a destination of the e-mail in the mail address input or selected by the user. The data processing unit 86 in charge of the mail processing then transmits the composed e-mail to the mail server 41 (Step S268).

As explained above, according to the service provision system 20, the mail distribution service can be provided to any device on the network under the environment used by a large number of unspecified users such as cloud services. When the service for distributing e-mail is to be provided, the service provision system 20 may execute a plurality of data processings set in the workflow and then perform the distribution of e-mail. When the mail distribution service is to be provided, the service provision system 20 may execute distribution processing of the e-mail at a specified time.

When the mail distribution service is to be provided, the service provision system 20 may distribute e-mail including data stored in a specified folder or data received by facsimile instead of distributing scanned image data.

Time-Specified Distribution Service

Figure 22:
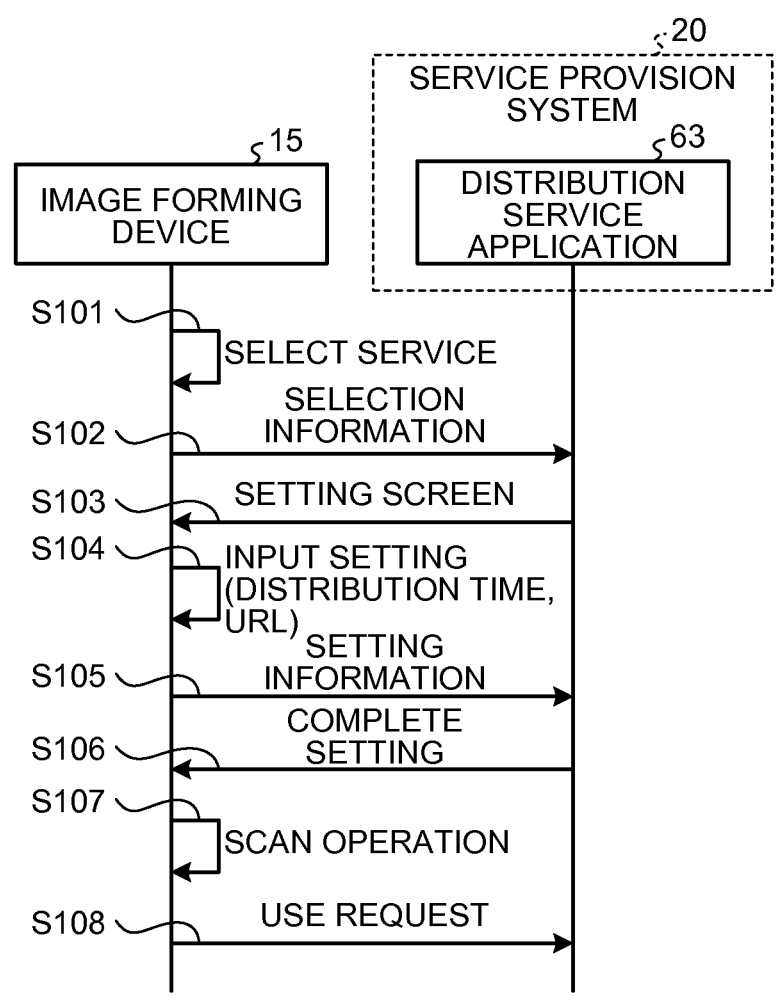
FIG. 22 is a sequence diagram upon execution of a time-specified distribution service.
Figure 23:
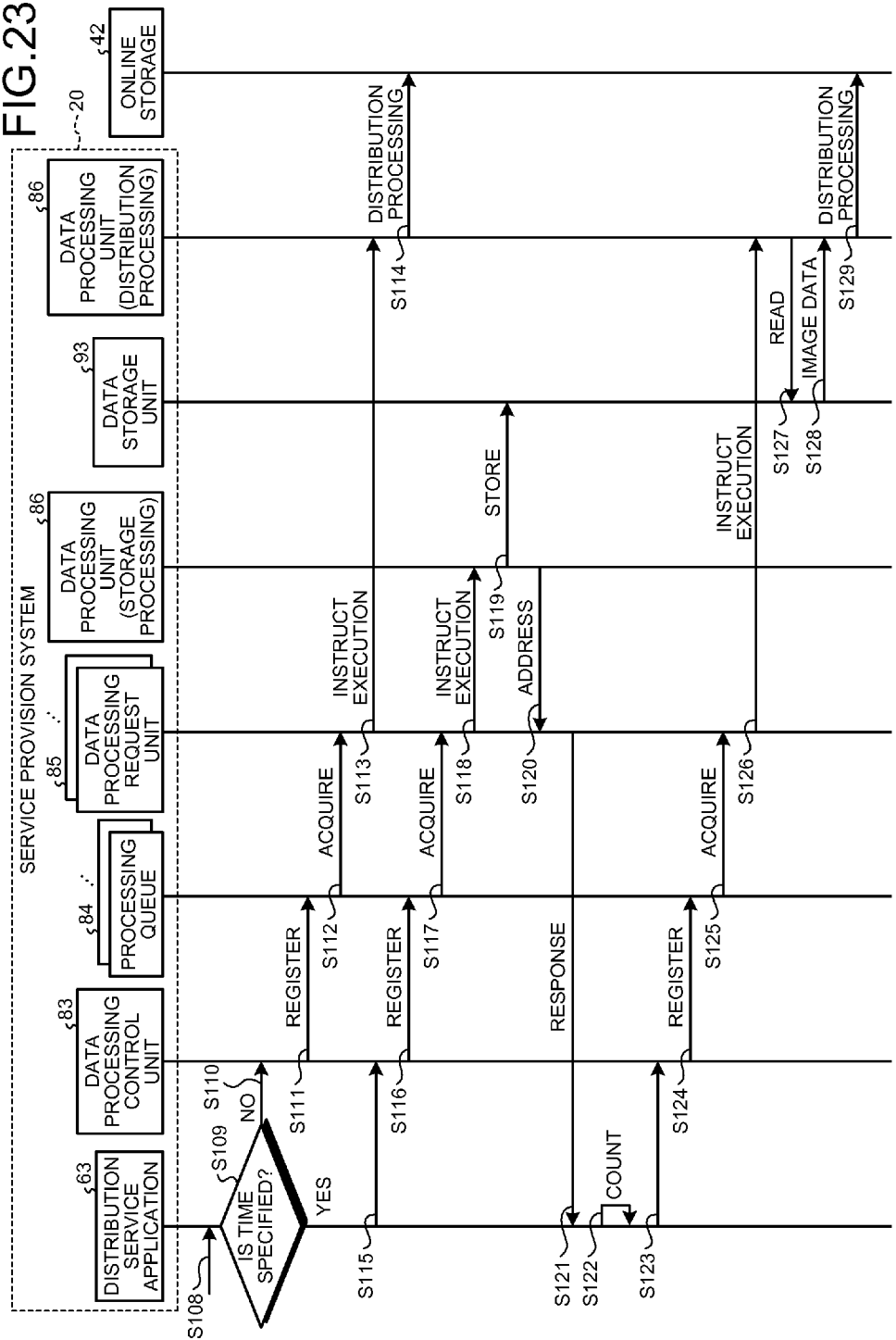
FIG. 23 is a sequence diagram continued from FIG. 22.

FIG. 22 and FIG. 23 are sequence diagrams upon execution of a time-specified distribution service. The service provision system 20 can provide a time-specified distribution service for distributing data obtained by scanning with the image forming device 15 to a specified storage device (e.g., the online storage 42) at a previously specified time. When the time-specified distribution service is to be provided, the processing is performed in the sequence illustrated in FIG. 22 and FIG. 23.

First of all, the user operates the display screen of the image forming device 15 to select a service (Step S101). The distribution service is selected herein. When the user selects the service, the image forming device 15 transmits selection information indicating the selected service to the service provision system 20 (Step S102).

The service provision system 20 activates a service application corresponding to the selection information. The distribution service application 63 is activated herein. The distribution service application 63 transmits the setting screen for various pieces of information required for executing the selected service to the image forming device 15 and causes the image forming device 15 to display the setting screen (Step S103). In the present example, the distribution service application 63 causes the image forming device 15 to display the setting screen including an item for setting a distribution time and an item for setting a URL of the online storage 42 as a distribution destination of the data.

Subsequently, the user inputs required information to the setting screen (Step S104). In the present example, the user inputs a distribution time, a URL of the online storage 42, and the like. An input method of the distribution time may be a method of directly inputting a specified time or may be a method of using a format for selecting a distribution time from among a plurality of preset candidates.

Subsequently, the image forming device 15 transmits the setting information input by the user to the service provision system 20 (Step S105). When receiving the setting information, the distribution service application 63 transmits a setting completion screen to the image forming device 15 and causes the image forming device 15 to display the setting completion screen (Step S106).

When the setting completion screen is displayed, then the user presses the scan start button and causes the image forming device 15 to perform scanning (Step S107). The image forming device 15 performs the scanning and transmits a service use request to the service provision system 20 (Step S108). At this time, the image forming device 15 also transmits the image data obtained by scanning to the service provision system 20.

When receiving the service use request from the image forming device 15 (Step S108 of FIG. 23), then the distribution service application 63 determines whether a distribution time is specified (Step S109). When the distribution time is not specified (No at Step S109), then the distribution service application 63 transmits a request of distribution processing to the data processing control unit 83 (Step S110). When receiving the request, the data processing control unit 83 analyzes the request and registers a message in a corresponding processing queue 84. The message registered in the processing queue 84 is temporarily stored.

When the data processing unit 86 in charge of the distribution processing becomes capable of processing, the data processing request unit 85 in charge of the distribution processing acquires the message registered in the corresponding processing queue 84 (Step S112). The data processing request unit 85 in charge of the distribution processing instructs the data processing unit 86 in charge of the distribution processing to execute the distribution processing indicated in the acquired message (Step S113). When receiving the instruction of the execution, the data processing unit 86 in charge of the distribution processing distributes the image data obtained by scanning to the specified online storage 42 (Step S114).

When the distribution time is specified (Yes at Step S109), the distribution service application 63 transmits a request of storage processing to the data processing control unit 83 (Step S115). When receiving the request, the data processing control unit 83 analyzes the request and registers a message in a corresponding processing queue 84 (Step S116).

When a data processing unit 86 in charge of the storage processing becomes capable of processing, a data processing request unit 85 in charge of the storage processing acquires the message registered in the corresponding processing queue 84 (Step S117). The data processing request unit 85 in charge of the storage processing instructs the data processing unit 86 in charge of the storage processing to execute the storage processing indicated in the acquired message (Step S118). When receiving the instruction of the execution, the data processing unit 86 in charge of the storage processing temporarily stores image data obtained by scanning in the data storage unit 93 (Step S119). The data processing unit 86 in charge of the storage processing sends back an address of the stored image data to the data processing request unit 85 in charge of the storage processing (Step S120). The data processing request unit 85 in charge of the storage processing then transmits a response including the acquired address to the distribution service application 63 (Step S121).

Subsequently, the distribution service application 63 counts time until the time reaches the specified distribution time (Step S122). When it reaches the specified distribution time, the distribution service application 63 transmits the request of distribution processing to the data processing control unit 83 (Step S123). In this case, the distribution service application 63 includes the address of the stored image data in the request. When receiving the request, the data processing control unit 83 analyzes the request and registers a message in a corresponding processing queue 84 (Step S124).

When the data processing unit 86 in charge of the distribution processing becomes capable of processing, the data processing request unit 85 in charge of the distribution processing acquires the message registered in the corresponding processing queue 84 (Step S125). The data processing request unit 85 in charge of the distribution processing instructs the data processing unit 86 in charge of the distribution processing to execute the distribution processing indicated in the acquired message (Step S126).

When receiving the instruction of the execution, the data processing unit 86 in charge of the distribution processing accesses the data storage unit 93 to read the image data from the address included in the instruction of the execution (Steps 3127, S128). The data processing unit 86 in charge of the distribution processing then distributes the image data obtained by scanning to the specified online storage 42 (Step S129).

As explained above, according to the service provision system 20, the service for distributing data to a specified storage device at a specified time can be provided to any device on the network under the environment used by a large number of unspecified users such as cloud services. When the service for distributing data at a specified time is to be provided, the service provision system 20 may execute a plurality of data processings set in the workflow and then perform the distribution processing.

Distribution Service of Facsimile-Received Data

Figure 24:
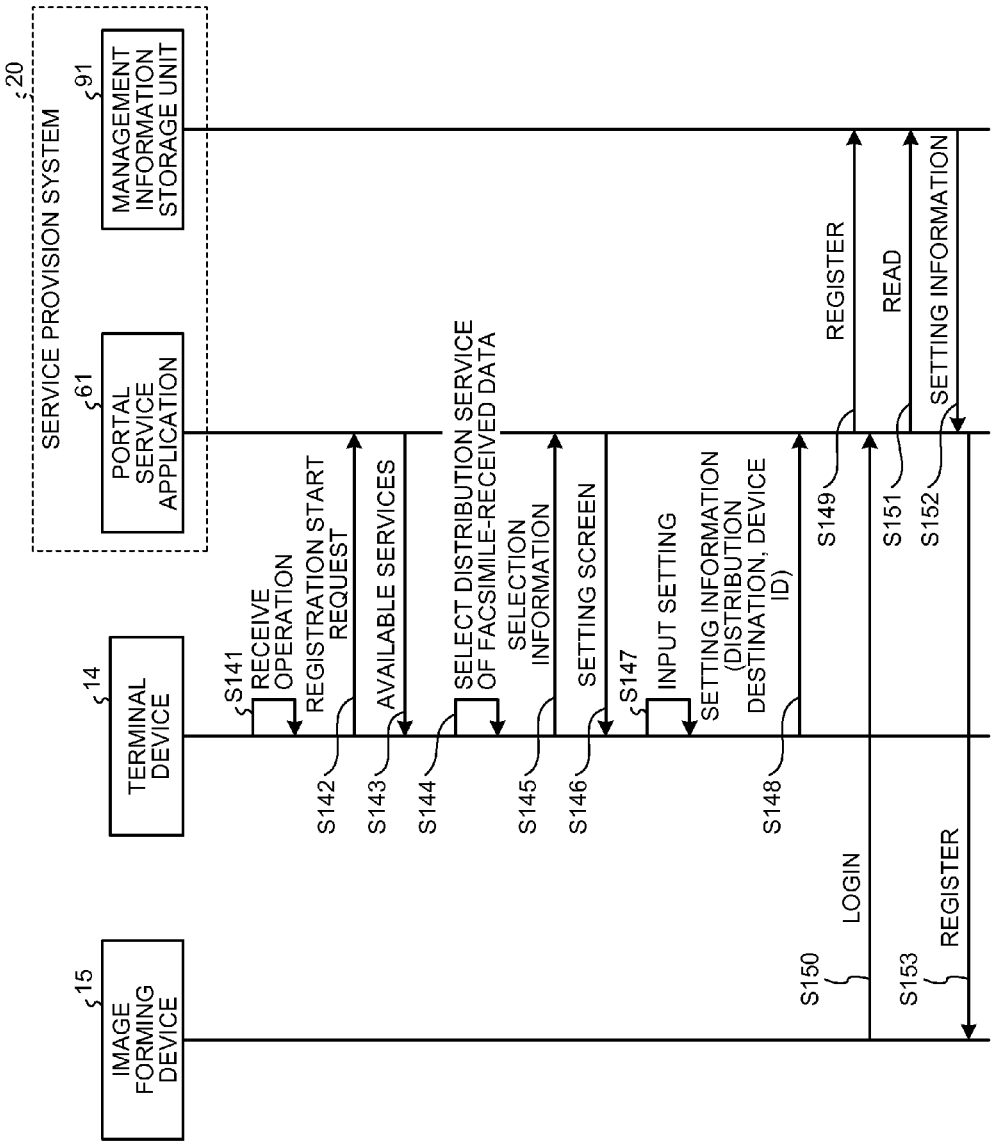
FIG. 24 is a sequence diagram upon registration of a distribution service of facsimile-received data.

FIG. 24 is a sequence diagram upon registration of a distribution service of facsimile-received data. The service provision system 20 can provide a service for distributing image data that the image forming device 15 receives by a facsimile function to a specified storage device (e.g., online storage 42). When the distribution service of the facsimile-received data is to be provided, the service registration is performed in the sequence illustrated in FIG. 24.

After the completion of the login to the service provision system 20, the terminal device 14 displays the service registration screen and receives a start operation of the service registration from the user (manager) (Step S141). When the user instructs the start of the registration, the terminal device 14 transmits a registration start request to the service provision system 20 (Step S142).

When receiving the registration start request from the terminal device 14, the portal service application 61 transmits a screen, which displays a list of services available by an organization stored in the management information storage unit 91 in association with the tenant ID of the organization to which the user belongs, to the terminal device 14 (Step 3143). The terminal device 14 displays the screen displaying the received list of the services and receives a selection operation of a service from the user (Step S144). The user selects the distribution service of facsimile-received data herein. When the user selects the distribution service of facsimile-received data, the terminal device 14 transmits the selection information for the service to the service provision system 20 (Step S145).

Subsequently, the portal service application 61 transmits a setting screen for various pieces of information required for providing the distribution service of facsimile-received data to the terminal device 14 and causes the terminal device 14 to display the setting screen (Step S146). The portal service application 61 causes the terminal device 14 to display the setting screen including, for example, items for setting a UIRL of the online storage 42 as a distribution destination of the facsimile-received data.

For example, the portal service application 61 causes the terminal device 14 to display the setting screen including the items for setting the device ID, and the like, of the image forming device 15 which is provided with the distribution service of the facsimile-received data. In this case, the portal service application 61 may cause the terminal device 14 to display a setting screen capable of collectively setting a plurality of image forming devices 15. For example, when the distribution service of facsimile-received data is provided to all the image forming devices 15 installed in a division of a certain company, the portal service application 61 may cause the terminal device 14 to display a setting screen including items for selecting a division name and the like.

Subsequently, the user inputs required information to the setting screen (Step S147). Then, the terminal device 14 transmits the setting information (e.g., URL of the online storage 42 as the distribution destination, device ID) input by the user to the service provision system 20 (Step S148). When receiving the setting information, the portal service application 61 registers the setting information, the tenant ID, and the selected service (distribution service of facsimile-received data) in the management information storage unit 91 in association with one another (Step S149).

Subsequently, the user moves to the image forming device 15 to be provided with the distribution service of the facsimile-received data, and logs in from the image forming device 15 to the service provision system 20 (Step S150). At this time, the user inputs the user ID of the user himself/herself as login information to cause the image forming device 15 to log in to the service provision system 20.

When the login is made through the image forming device 15 and it is determined that the authentication is successful, the portal service application 61 accesses the management information storage unit 91 to read the setting information stored in association with the device ID of the logged-in image forming device 15 and the tenant ID (Steps S151, S152). The portal service application 61 transmits the read setting information to the image forming device 15 and registers the setting information in the image forming device 15 (Step S153). Thereby the image forming device 15 can log in to the service provision system 20 before the reception of data by facsimile and use the subsequent distribution service of the facsimile-received data.

Figure 25:
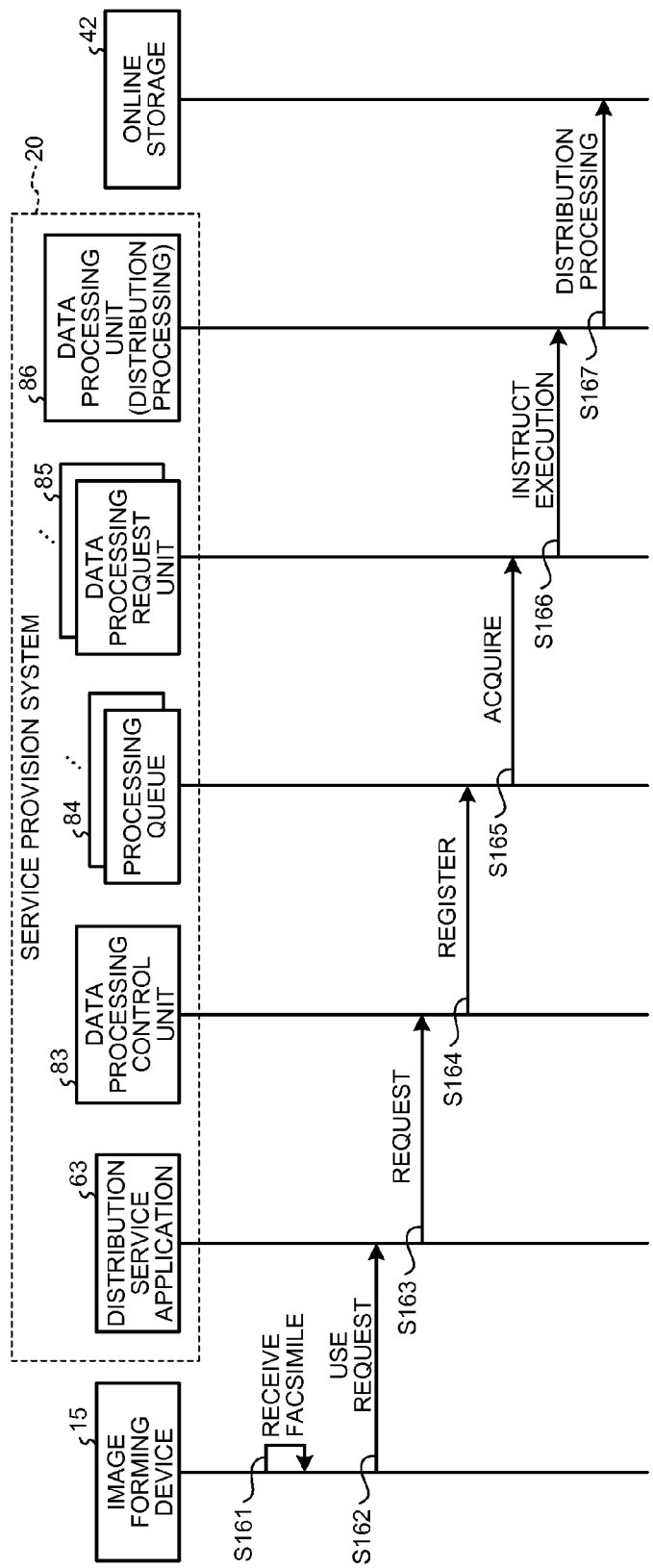
FIG. 25 is a sequence diagram upon execution of the distribution service of facsimile-received data.

FIG. 25 is a sequence diagram upon execution of the distribution service of facsimile-received data. When the distribution service of facsimile-received data is to be provided, the processing is performed in the sequence illustrated in FIG. 25.

When receiving the facsimile (Step S161), the image forming device 15 transmits a use request of distribution service of facsimile-received data to the service provision system 20 (Step S162). At this time, the image forming device 15 also transmits the image data received by facsimile to the service provision system 20.

When receiving the use request of distribution service of facsimile-received data from the image forming device 15, the distribution service application 63 transmits a request of distribution processing to the data processing control unit 83 (Step S163). When receiving the request, the data processing control unit 83 analyzes the request and registers a message in a corresponding processing queue 84 (Step S164). The message registered in the processing queue 84 is temporarily stored. When the data processing unit 86 in charge of the distribution processing becomes capable of processing, the data processing request unit 85 in charge of the distribution processing acquires the message registered in the corresponding processing queue 84 (Step S165). The data processing request unit 85 in charge of the distribution processing instructs the data processing unit 86 in charge of the distribution processing to execute the distribution processing indicated in the acquired message (Step S166). When receiving the instruction of the execution, the data processing unit 86 in charge of the distribution processing distributes the image data received by facsimile to the online storage 42 of the specified URL (Step S167).

As explained above, according to the service provision system 20, the service for distributing facsimile-received data to a specified storage device can be provided to the image forming device 15 on the network under the environment used by a large number of unspecified users such as cloud services. When the distribution service of the facsimile-received data is to be provided, the service provision system 20 may execute a plurality of data processings set in the workflow and then perform the distribution processing. Moreover, when the distribution service of the facsimile-received data is to be provided, the service provision system 20 may perform the distribution processing at a specified time.

Folder Monitoring Service

Figure 26:
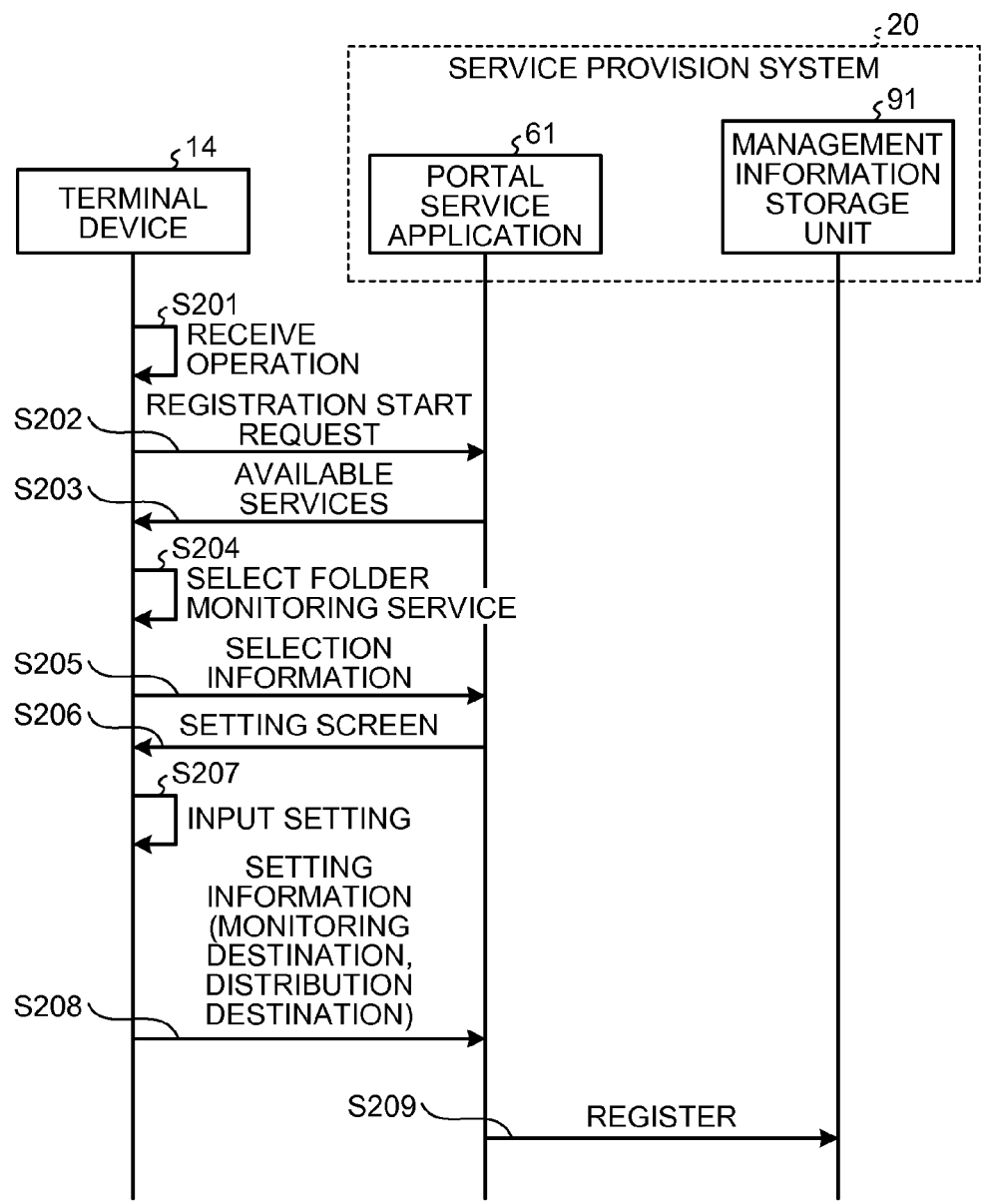
FIG. 26 is a sequence diagram upon registration of a folder monitoring service.

FIG. 26 is a sequence diagram upon registration of a folder monitoring service. When data is stored in a specified storage device (e.g., in a specified folder in the online storage 42), the service provision system 20 can provide a service for reading the stored data and distributing the read data to any other specified storage device (other online storage 42). When the folder monitoring service is to be provided, the service registration is performed in the sequence illustrated in FIG. 26.

After the completion of the login to the service provision system 20, the terminal device 14 displays the service registration screen and receives a start operation of the service registration from the user (manager) (Step S201). When the user instructs the start of the registration, the terminal device 14 transmits a registration start request to the service provision system 20 (Step S202).

When receiving the registration start request from the terminal device 14, the portal service application 61 transmits a screen, which displays a list of services available by an organization stored in the management information storage unit 91 in association with the tenant ID of the organization to which the user belongs, to the terminal device 14 (Step S203). The terminal device 14 displays the screen displaying the received list of the services and receives a selection operation of a service from the user (Step S204). The user selects the folder monitoring service herein. When the user selects the folder monitoring service, the terminal device 14 transmits the selection information for the service to the service provision system 20 (Step S205).

Subsequently, the portal service application 61 transmits a setting screen for various pieces of information required for providing the folder monitoring service to the terminal device 14 and causes the terminal device 14 to display the setting screen (Step S206). The portal service application 61 causes the terminal device 14 to display the setting screen including, for example, items for setting a URL of the online storage 42 as a monitoring destination of a folder and a URL of the online storage 42 as a distribution destination of data.

Subsequently, the user inputs required information to the setting screen (Step S207). Then, the terminal device 14 transmits the setting information (e.g., a URL of the online storage 42 as a monitoring destination of a folder and a URL of the online storage 42 as a distribution destination) input by the user to the service provision system 20 (Step S208). When receiving the setting information, the portal service application 61 registers the received setting information in the management information storage unit 91 (Step S209). This enables the terminal device 14 to use the folder monitoring service.

FIG. 27 is a sequence diagram upon execution of the folder monitoring service. When the folder monitoring service is to be provided, the processing is performed in the sequence illustrated in FIG. 27.

The terminal device 14 accesses the portal site of the service provision system 20 and transmits a use request of the folder monitoring service to the service provision system 20 (Step S211). When receiving the use request of the folder monitoring service, the service provision system 20 activates the distribution service application 63.

The distribution service application 63 transmits a request of monitoring processing to the data processing control unit 83 according to the use request received from the terminal device 14 (Step S212). When receiving the request, the data processing control unit 83 analyzes the request and registers a message in a corresponding processing queue 84 (Step S213). The message registered in the processing queue 84 is temporarily stored. When a data processing unit 86 in charge of the monitoring processing becomes capable of processing, a data processing request unit 85 in charge of the monitoring processing acquires the message registered in the corresponding processing queue 84 (Step S214). The data processing request unit 85 in charge of the monitoring processing instructs the data processing unit 86 in charge of the monitoring processing to execute the monitoring processing indicated in the acquired message (Step S215). When receiving the instruction of the execution, the data processing unit 86 in charge of the monitoring processing starts monitoring whether any data is stored in the online storage 42 of the URL specified as the monitoring destination (Step S216).

When some data is stored in the online storage 42 as the monitoring destination (Step S217), the data processing unit 86 in charge of the monitoring processing acquires the stored data and temporarily stores the acquired data in the data storage unit 93 (Step S218). The data processing unit 86 in charge of the monitoring processing transmits response information indicating the acquisition of the data together with an address of the stored data to the data processing request unit 85 in charge of the monitoring processing (Step S219). The data processing request unit 85 in charge of the monitoring processing then transmits the response information together with the address to the distribution service application 63 (Step S220).

Subsequently, when receiving the response from the data processing request unit 85 in charge of the monitoring processing, the distribution service application 63 transmits a request of distribution processing to the data processing control unit 83 (Step S221). In this case, the distribution service application 63 includes the address where the data is stored in the request.

When receiving the request, the data processing control unit 83 analyzes the request and registers a message in a corresponding processing queue 84 (Step S222). The message registered in the processing queue 84 is temporarily stored. When the data processing unit 86 in charge of the distribution processing becomes capable of processing, the data processing request unit 85 in charge of the distribution processing acquires the message registered in the corresponding processing queue 84 (Step S223). The data processing request unit 85 in charge of the distribution processing instructs the data processing unit 86 in charge of the distribution processing to execute the distribution processing indicated in the acquired message (Step S224).

When receiving the instruction of the execution, the data processing unit 86 in charge of the distribution processing accesses the data storage unit 93 to read the data from the address included in the address. The data processing unit 86 in charge of the distribution processing distributes the acquired data to the online storage 42 specified as the distribution destination (Step S225).

As explained above, according to the service provision system 20, the folder monitoring service can be provided to any device on the network under the environment used by a large number of unspecified users such as cloud services. When the folder monitoring service is to be provided, the service provision system 20 may execute a plurality of data processings set in the workflow and then perform the distribution processing. Moreover, when the folder monitoring service is to be provided, the service provision system 20 may perform the distribution processing at a specified time.

The programs executed by the service provision system 20 according to the present embodiment are recorded in a computer-readable recording medium such as a compact disk read only memory (CD-ROM), flexible disk (FD), a compact disk recordable (CD-R), and a digital versatile disc (DVD) in an installable or executable file format.

The programs executed by the service provision system 20 according to the present embodiment may be configured so as to be provided by being stored on a computer connected to a network such as the Internet and being downloaded via the network. Moreover, the programs executed by the service provision system 20 according to the present embodiment may be configured so as to be provided or distributed via a network such as the Internet.

The programs executed by the service provision system 20 according to the present embodiment are module configurations including part of or all of the units (the service provision unit 31, the platform API 32, and the platform 33). Actual hardware is configured so that the CPU (processor) reads a program from the recording medium and executes it, the units are thereby loaded onto a main storage device, and part of or all of the service provision unit 31, the platform API 32, and the platform 33 are generated on the main storage device.

According to an embodiment, the mail distribution service can be provided to any device connected via a network under the environment used by a large number of unspecified users.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A service provision system that includes one or more information processing devices and provides a service to a device connected thereto via a network, comprising:
a management information storage unit that stores management information for managing user identification information for identifying a user, device identification information for identifying a first device, and service identification information for identifying a service registered as a use object in association with one another, the user identification information including first user identification information for identifying the user in the service provision system and second user identification information for identifying the user in the first device, the first user identification information allowing the user to login to the service provision system only if the first user identification information is registered in the service provision system, the second user identification information allowing the user to login to the service provision system even if the second user identification information is not registered in the service provision system;
an authentication information receiving unit that receives authentication information including user authentication information used for user authentication and device authentication information used for device authentication from the device connected via the network;
an authentication unit that executes authentication processing of the received authentication information;
a service specifying unit that specifies, when the authentication information is authenticated, a service associated with the authentication information based on the authentication information and the management information; and
a first execution unit that receives a use request of a mail distribution service from the first device connected via the network, composes a mail according to the use request of the mail distribution service received from the first device, and distributes the composed mail to a previously specified mail server connected to the service provision system via a network.

2. The service provision system according to claim 1, wherein the first execution unit causes the first device to display a list of previously registered mail addresses, and distributes the mail using a mail address selected by a user from the list as a destination.

3. The service provision system according to claim 1, wherein the first execution unit receives the mail address input by the user from the first device, determines whether to allow mail transmission to a domain of the received mail address, and distributes, when allowed, the mail using the mail address as a destination to the mail server.

4. The service provision system according to claim 1, further comprising a second execution unit that distributes the received data to a specified storage device connected to the service provision system via the network based on a predetermined condition.

5. The service provision system according to claim 4, wherein the second execution unit receives a use request of a distribution service of data from the first device connected via the network, and distributes the data received from the first device to the specified storage device connected to the service provision system via the network at a specified time being the predetermined condition according to the use request of the distribution service received from the first device.

6. The service provision system according to claim 5, wherein the second execution unit determines whether a distribution time is specified according to the use request of the distribution service received from the first device, temporarily stores the data when the distribution time is specified, and then distributes the data to the storage device at the specified time.

7. The service provision system according to claim 4, wherein the second execution unit receives, when the first device connected via the network receives a facsimile, a use request of a distribution service of the facsimile from the first device, and distributes image data received by the first device to a specified storage device connected to the service provision system via the network according to the use request being the predetermined condition.

8. The service provision system according to claim 7, wherein before the second execution unit receives the use request of the distribution service of the facsimile from the first device, the authentication information receiving unit previously receives the authentication information from the first device, and the authentication unit previously performs authentication processing on the authentication information.

9. The service provision system according to claim 4, wherein the second execution unit monitors whether data is stored in a specified storage device connected via the network according to a use request of a folder monitoring service, acquires, when the data is stored in the storage device, which is the predetermined condition, the data via the network, and transmits the acquired data to another specified storage device.

10. The service provision system according to claim 1, wherein
the management information storage unit stores the management information for managing organization identification information for identifying an organization, the user identification information, the device identification information, and the service identification information in association with one another,
the authentication information receiving unit receives authentication information including organization authentication information used for organization authentication, the user authentication information, and the device authentication information from the first device connected via the network, and
the service specifying unit specifies the service associated with the organization authentication information, the user identification information, and the device identification information.

11. The service provision system according to claim 1, further comprising:
a license information storage unit that stores license information in which first service identification information for identifying a first service out of the service identification information and being a license of the first service is associated with register information for registering the first service identification information as a use object;
a license authenticating unit that executes license authentication, in response to reception of a registration request including the first service identification information and the registration information, based on the received first service identification information and registration information, and based on the license information; and a first registration unit that registers the received first service identification information as a use object of the service in the management information when the license is authenticated.

12. The service provision system according to claim 1, wherein
the management information storage unit stores the first user identification information and the second user identification information as the user identification information for identifying a user who logs in to the service provision system,
the authentication information receiving unit receives either one of the first user authentication information and the second user authentication information being user identification information of the user authenticated by another authentication unit, as the user authentication information used for user authentication from the device connected via the network, and
the authentication unit executes user authentication, when the authentication information receiving unit receives the first user authentication information, based on the first user authentication information and the first user identification information, and executes user authentication, when the authentication information receiving unit receives the second user authentication information, based on the second user authentication information and the second user identification information.

13. The service provision system according to claim 1, wherein
the management information storage unit stores third user authentication information being authentication information for the user logging in to an external service connected to the service provision system via a network, and,
when the processing according to the received use request includes processing of cooperating with the external service,
the first execution unit executes login processing to the external service based on the third user authentication information authenticated by the authentication unit.

14. The service provision system according to claim 1, wherein the first execution unit includes:
an execution request storage unit that stores execution request information for data processing requested to be executed;
a data processing control unit that registers execution request information for causing specific data processing to be executed in the execution request storage unit according to the use request; and
a plurality of data processing units each of which executes data processing according to execution request information for predetermined data processing, from among pieces of execution request information registered in the execution request storage unit, and
each of the data processing units registers, when next data processing is to be performed as a result of executing data processing, execution request information for the next data processing in the execution request storage unit.

15. The service provision system according to claim 14, wherein each of the data processing units includes a data processing unit that registers the execution request information for the next data processing in the execution request storage unit after generating a plurality of pieces of the execution request information according to the execution request information.

16. A service provision method executed by a service provision system that includes one or more information processing devices and provides a service to a device connected thereto via a network, the method comprising:
storing management information for managing user identification information for identifying a user, device identification information for identifying a first device, and service identification information for identifying a service registered as a use object in association with one another in a management information storage unit, the user identification information including first user identification information for identifying the user in the service provision system and second user identification information for identifying the user in the first device, the first user identification information allowing the user to login to the service provision system only if the first user identification information is registered in the service provision system, the second user identification information allowing the user to login to the service provision system even if the second user identification information is not registered in the service provision system;
receiving authentication information including user authentication information used for user authentication and device authentication information used for device authentication from the device connected via the network;
executing authentication processing of the received authentication information;
specifying, when the authentication information is authenticated, a service associated with the authentication information based on the authentication information and the management information; and
executing including receiving a use request of a mail distribution service from the first device connected via the network, composing a mail according to the use request of the mail distribution service received from the first device, and distributing the composed mail to a previously specified mail server connected to the service provision system via a network.

17. A computer program product comprising a non-transitory computer-readable medium containing an information processing program causing an information processing device to function as a service provision system that provides a service to a device connected thereto via a network, the program causing the information processing device to function as:
a management information storage unit that stores management information for managing user identification information for identifying a user, device identification information for identifying a first device, and service identification information for identifying a service registered as a use object in association with one another, the user identification information including first user identification information for identifying the user in the service provision system and second user identification information for identifying the user in the first device, the first user identification information allowing the user to login to the service provision system only if the first user identification information is registered in the service provision system, the second user identification information allowing the user to login to the service provision system even if the second user identification information is not registered in the service provision system;
an authentication information receiving unit that receives authentication information including user authentication information used for user authentication and device authentication information used for device authentication from the device connected via the network;

an authentication unit that executes authentication processing of the received authentication information;

a service specifying unit that specifies, when the authentication information is authenticated, a service associated with the authentication information based on the authentication information and the management information; and a first execution unit that receives a use request of a mail distribution service from the first device connected via the network, composes a mail according to the use request of the mail distribution service received from the first device, and distributes the composed mail to a previously specified mail server connected to the service provision system via a network.

\* \* \* \* \*